United States Patent
Zhou et al.

(10) Patent No.: US 12,267,716 B2
(45) Date of Patent: Apr. 1, 2025

(54) INTER-UE CROSS-LINK INTERFERENCE (CLI) MITIGATION FOR BASE STATION IN FULL DUPLEX MODE

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 648 days.

(21) Appl. No.: 17/531,359

(22) Filed: Nov. 19, 2021

(65) Prior Publication Data

US 2023/0164606 A1    May 25, 2023

(51) Int. Cl.
| | | |
|---|---|---|
| H04W 24/10 | (2009.01) | |
| H04B 7/08 | (2006.01) | |
| H04B 17/336 | (2015.01) | |
| H04L 5/14 | (2006.01) | |

(52) U.S. Cl.
CPC ............ *H04W 24/10* (2013.01); *H04B 7/088* (2013.01); *H04B 17/336* (2015.01); *H04L 5/1461* (2013.01)

(58) Field of Classification Search
CPC ...... H04B 17/345; H04B 17/24; H04B 7/088; H04B 7/0617; H04W 24/10; H04W 72/541; H04W 72/046; H04L 5/0048; H04L 5/007; H04L 5/1469; H04L 5/0023
See application file for complete search history.

(56) References Cited

U.S. PATENT DOCUMENTS

| | | | | |
|---|---|---|---|---|
| 2021/0250797 | A1* | 8/2021 | Karjalainen | H04L 1/0026 |
| 2021/0321417 | A1* | 10/2021 | Kim | H04L 5/0048 |
| 2022/0116129 | A1* | 4/2022 | Ying | H04B 7/0617 |
| 2023/0100135 | A1* | 3/2023 | Liu | H04B 7/0695 370/252 |
| 2023/0318690 | A1* | 10/2023 | Kurras | H04B 7/086 375/262 |
| 2023/0319605 | A1* | 10/2023 | Park | H04J 11/00 370/252 |
| 2024/0015537 | A1* | 1/2024 | Zhang | H04B 7/0626 |
| 2024/0187080 | A1* | 6/2024 | Ghanbarinejad | H04B 7/088 |

\* cited by examiner

*Primary Examiner* — Habte Mered

(74) *Attorney, Agent, or Firm* — Arent Fox Schiff LLP

(57) ABSTRACT

A victim user equipment (UE) may experience cross-link interference (CLI) from transmissions from an aggressor UE. The present disclosure provides for configuration of a CLI report that accurately characterizes the CLI experienced by the victim UE for different beams. A base station may transmit to the victim UE, a configuration for CLI reporting associated with a plurality of measurement resources, the configuration identifying a quasi-co-location (QCL) information associated with each measurement resource. The victim UE may measure interference metrics on the plurality of measurement resources based on the configuration for CLI reporting and the QCL information associated with each measurement resource. The victim UE may transmit a CLI report to the base station, the CLI report including a subset of the interference metrics associated with reported measurement resources and identifying the QCL information associated with the reported measurement resources.

30 Claims, 15 Drawing Sheets

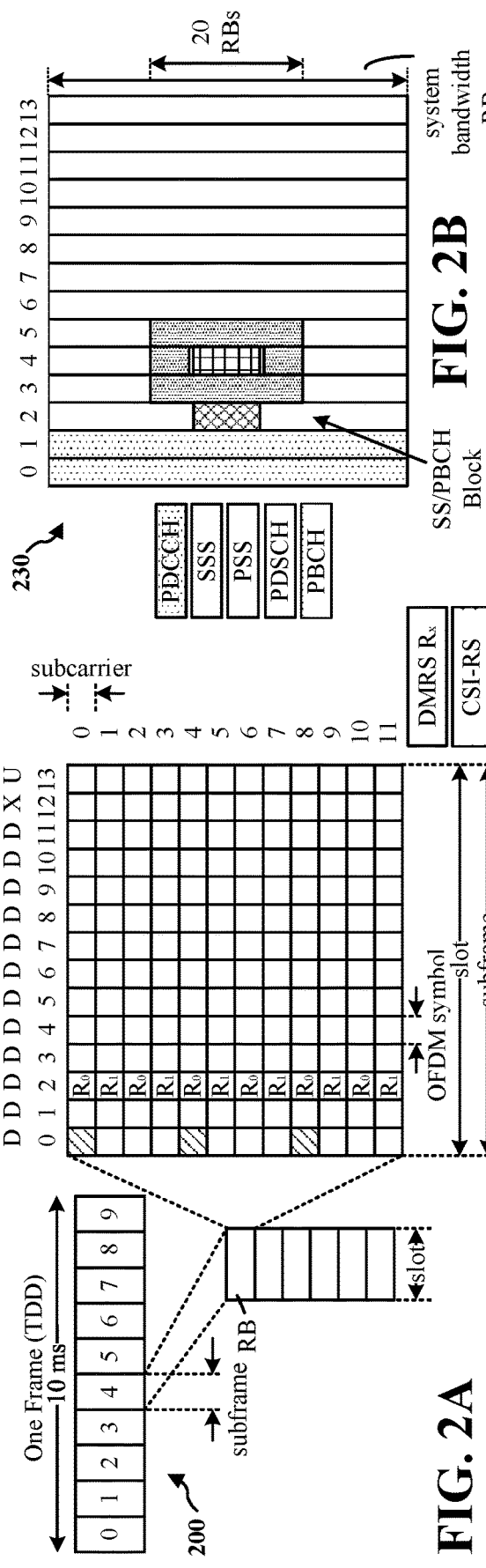
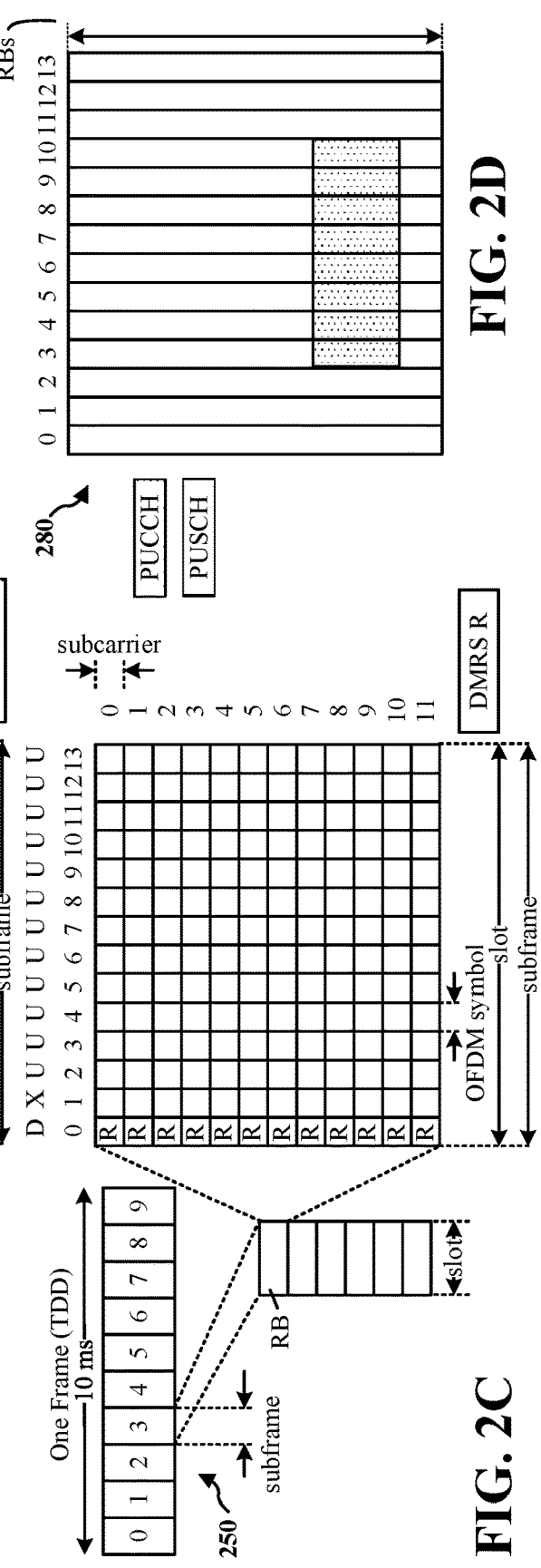
FIG. 2A
FIG. 2B
FIG. 2C
FIG. 2D

INTER-UE CROSS-LINK INTERFERENCE (CLI) MITIGATION FOR BASE STATION IN FULL DUPLEX MODE

BACKGROUND

Technical Field

The present disclosure relates generally to communication systems, and more particularly, to mitigation of cross-link interference (CLI) between user equipment (UEs) for base stations in full duplex mode.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a non-transitory computer-readable medium, and an apparatus for a victim user equipment (UE) are provided. The method may include receiving, from a base station, a configuration for cross-link interference (CLI) reporting associated with a plurality of measurement resources, the configuration identifying a quasi-co-location (QCL) information associated with each measurement resource. The method may include measuring interference metrics on the plurality of measurement resources based on the configuration for CLI reporting and the QCL information associated with each measurement resource. The method may include transmitting a CLI report to the base station, the CLI report including a subset of the interference metrics associated with reported measurement resources and identifying the QCL information associated with the reported measurement resources.

The present disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

In another aspect, the disclosure provides a method, a non-transitory computer-readable medium, and an apparatus for a base station. The method may include transmitting, to a victim UE, a configuration for CLI reporting associated with a plurality of measurement resources, the configuration identifying a QCL information corresponding to each measurement resource. The method may include receiving a CLI report including reported interference metrics for a subset of the measurement resources and associated QCL information corresponding to the reported interference metrics.

The present disclosure also provides an apparatus (e.g., a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

In another aspect, the disclosure provides a method, a non-transitory computer-readable medium, and an apparatus for an aggressor UE. The method may include receiving, from a base station, a sounding reference signal (SRS) configuration corresponding to a plurality of CLI measurement resources for at least one victim UE, the SRS configuration identifying a transmission configuration indication (TCI) state spatial relation parameter and a panel for SRS transmission corresponding to each CLI measurement resource. The method may include transmitting an SRS using the TCI state spatial relation parameter, the panel, and a same SRS port on the CLI measurement resources.

The present disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with certain aspects of the present description.

FIG. 2B is a diagram illustrating an example of downlink (DL) channels within a subframe, in accordance with certain aspects of the present description.

FIG. 2C is a diagram illustrating an example of a second frame, in accordance with certain aspects of the present description.

FIG. 2D is a diagram illustrating an example of uplink (UL) channels within a subframe, in accordance with certain aspects of the present description.

DETAILED DESCRIPTION

Figure 1:
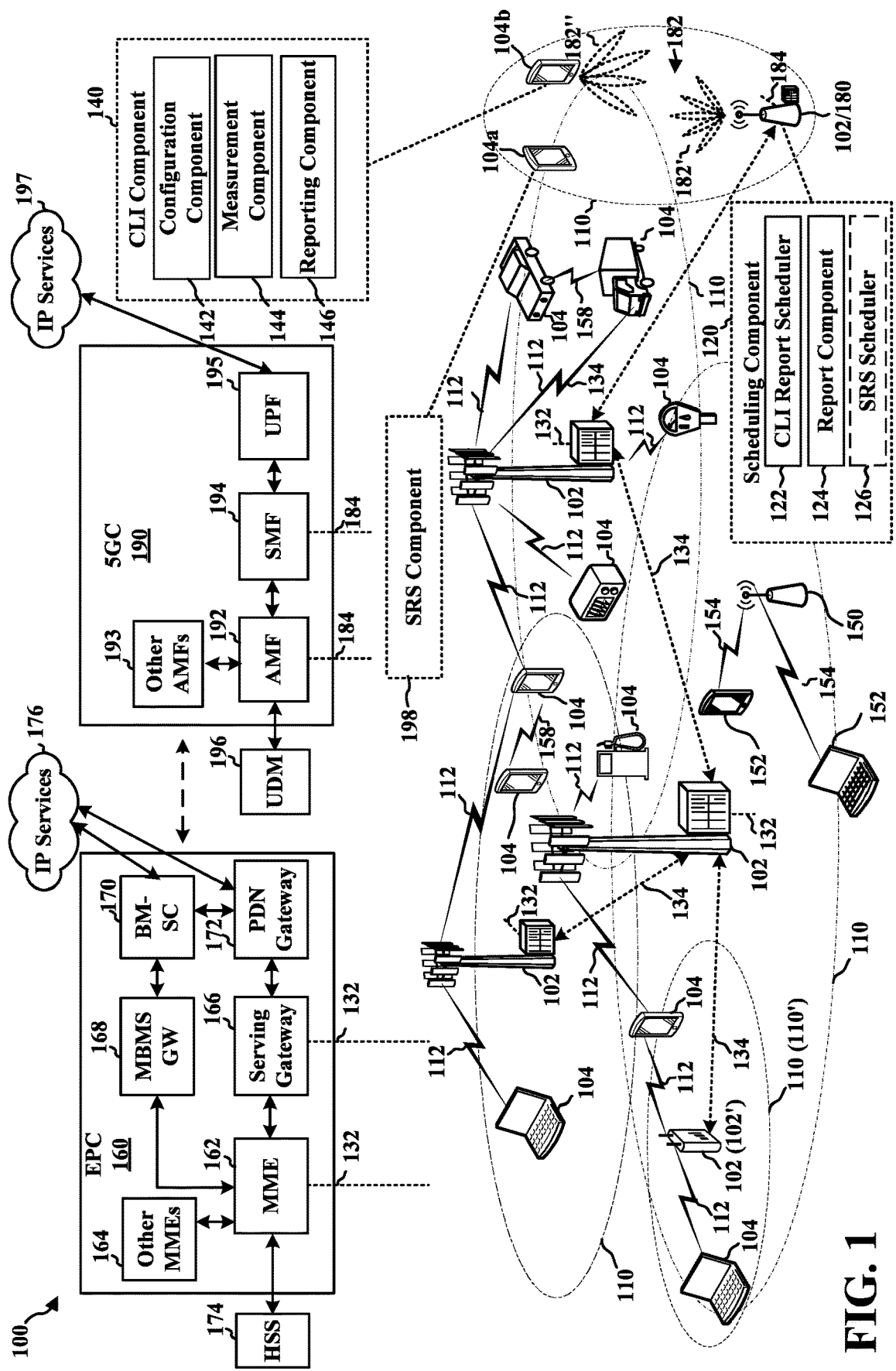
FIG. 1 is a diagram illustrating an example of a wireless communications system including an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

Full duplex communication may allow a wireless communication device to transmit and receive at the same time. In-band full duplex (IBFD) may refer to transmission and reception on the same time and frequency resource. The uplink (UL) and the downlink (DL) may share the same IBFD time and frequency resource, which may include fully overlapping resources or partially overlapping resources. Sub-band frequency division duplexing (SBFD) may refer to transmission and reception at the same time on different frequency resources. The DL resource may be separated from the UL resource in the frequency domain. In an access network, a base station and/or a user equipment (UE) may be capable of either IBFD or SBFD.

The presence of full duplex devices in an access network may result in configurations with different types of interference experienced by a UE. Inter-cell interference may include interference from other gNBs and exist without the presence of full duplex devices. Channel state information (CSI) measurements may be used to measure inter-cell interference. Inter-cell cross-link interference (CLI) may occur between UEs in adjacent cells. Intra-cell CLI may occur between UEs in the same cell. For example, an uplink transmission from an aggressor UE may interfere with a downlink reception of a victim UE. In the case of a full-duplex UE, self-interference (SI) may be considered a special case of intra-cell CLI, where the transmitter of the UE acts as an aggressor UE that interferes with a downlink reception by the receiver of the UE.

Existing techniques for measuring CLI may not account for the effects of beam selection on CLI. Generally, the selection of a receive beam for the CLI measurements may be left to the UE. Accordingly, even if the base station receives a CLI report, the base station may not receive information about the CLI for different UE receive beams. Additionally, if existing CLI measurement procedures are extended to include measurements for specific beams, the number.

In an aspect, the present disclosure provides for configuring a victim UE to generate a CLI report for multiple beams. The configuration of the CLI report may configure the UE with a set of measurement resources and identify a quasi-co-location (QCL) information associated with each measurement resource. The victim UE may measure interference metrics on the measurement resources using the beam indicated by the QCL for each respective measurement resource. For example, the interference metrics may be layer 1 (L1) SRS RSRP or L1 RSSI. In some implementations, the QCL information may change while a transmit beam for the measured reference signal remains constant. In other implementations, the QCL information may remain constant while the transmit beams for the measured reference signals change. In either case, the base station may configure the victim UE to generate a CLI report that provides information about CLI experienced on different receive beams. To reduce the overhead of the CLI report, the UE may include a subset of the interference metrics. For example, the UE may include interference metrics associated with reported measurement resources with less CLI than measurement resources that are not reported. The UE may identify the QCL information associated with the reported measurement resources. The report may allow the base station to identify beams or combination of beams that experience less CLI and may be suitable for communication.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network (e.g., a 5G Core (5GC) 190). The UEs 104 may include an aggressor UE 104a and a victim UE 104b. The base stations 102 may include macrocells (high power cellular base station) and/or small cells (low power cellular base station). The macrocells include base stations. The small cells include femtocells, picocells, and microcells.

One or more of the UEs 104 (e.g., the victim UE 104b) may include a CLI component 140 that measures a CLI based on a configuration and reports the CLI to the base station 102. The CLI component 140 may include a configuration component 142 configured to receive, from a base station, a configuration for cross-link interference (CLI) reporting associated with a plurality of measurement resources, the configuration identifying a quasi-co-location (QCL) information associated with each measurement resource. The CLI component 140 may include a measurement component 144 configured to measure interference metrics on the plurality of measurement resources based on the configuration for CLI reporting and the QCL information associated with each measurement resource. The CLI component 140 may include a reporting component 146 configured to transmit a CLI report to the base station, the CLI report including a subset of the interference metrics associated with reported measurement resources and identifying the QCL information associated with the reported measurement resources.

In an aspect, one or more of the aggressor UEs 104a may include a sounding reference signal (SRS) component 198 configured to transmit an SRS, which may be used by the victim UE 104b for CLI measurements. As illustrated in further detail in FIG. 13, the SRS component 198 may include an SRS configuration component 1310 configured to receive, from a base station, a sounding reference signal (SRS) configuration corresponding to a plurality of cross-link interference (CLI) measurement resources for at least one victim UE, the SRS configuration identifying a transmission configuration indication (TCI) state spatial relation parameter and a panel for SRS transmission corresponding to each CLI measurement resource, and an SRS generator component 1320 configured to transmit an SRS using the TCI state spatial relation parameter, the panel, and a same SRS port on the CLI measurement resources.

In an aspect, one or more of the base stations 102 may include a scheduling component 120 that performs the actions of the base station as described herein (e.g., scheduling the scheduling victim UEs to measure CLI and aggressor UEs to transmit SRS. For example, the scheduling component 120 may include a CLI report scheduler 122 configured to transmit, to a victim UE, a configuration for cross-link interference (CLI) reporting associated with a plurality of measurement resources, the configuration identifying a quasi-co-location (QCL) information corresponding to each measurement resource. The scheduling component 120 may include a report component 124 configured to receive a CLI report including reported interference metrics for a subset of the measurement resources and associated QCL information corresponding to the reported interference metrics. The scheduling component 120 may optionally include an SRS scheduler 126 configured to transmit, to one or more aggressor UEs, an SRS configuration corresponding to the plurality of CLI measurement resources for the victim UE, the SRS configuration identifying a transmission configuration indication (TCI) state spatial relation parameter and a panel for SRS transmission corresponding to each CLI measurement resource.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The backhaul links 132 may be wired or wireless. The base stations 102 configured for 5G NR (collectively referred to as Next Generation RAN (NG-RAN)) may interface with 5GC 190 through backhaul links 184. The backhaul links 184 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and a physical sidelink feedback channel (PSFCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D are resource diagrams illustrating example frame structures and channels that may be used for uplink, downlink, and sidelink transmissions to a UE 104 including a CLI component 140. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
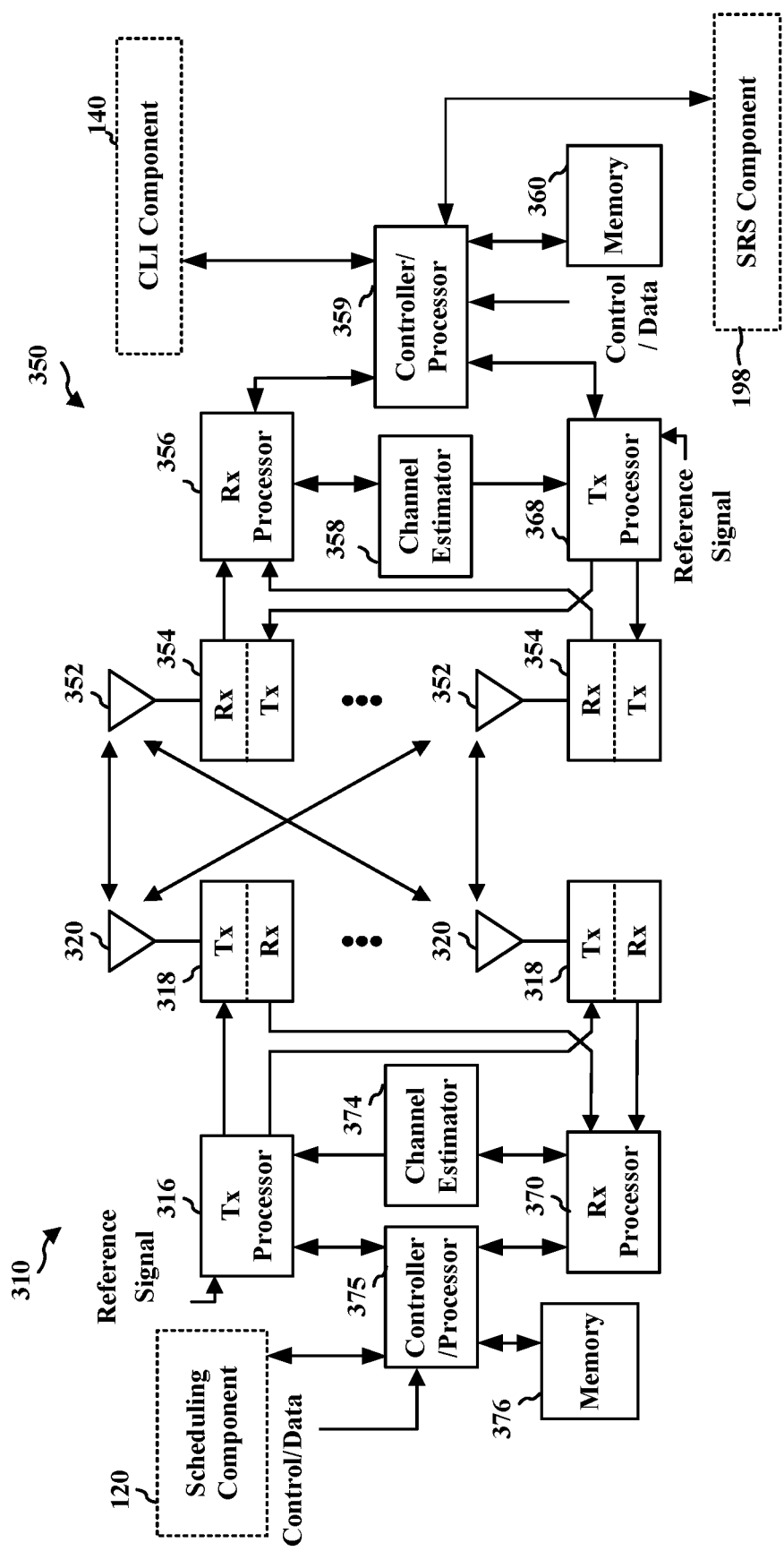
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate an RF carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160 or 5GC 190. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the CLI component 140 and/or the SRS component 198 of FIG. 1.

At least one of the Tx processor 316, the Rx processor 370, and the controller/processor 375 may be configured to perform aspects in connection with the scheduling component 120 of FIG. 1.

FIGS. 4A-4D illustrate various modes of full-duplex communication. Full-duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

Figure 4A:
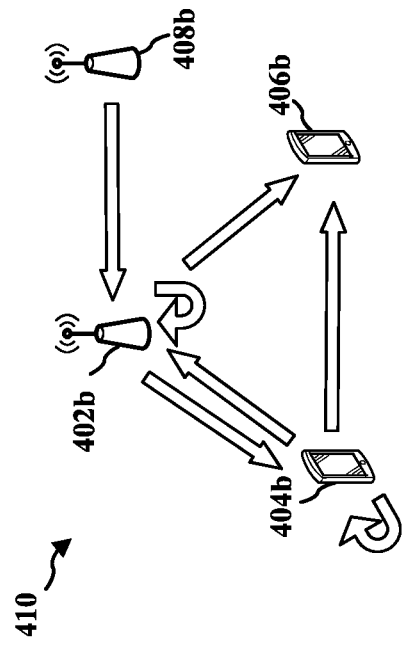
FIGS. 4A, 4B, 4C, and 4D illustrate exemplary modes of full-duplex communication, in accordance with certain aspects of the present description.

FIG. 4A shows a first example of full-duplex communication 400 in which a first base station 402a is in full duplex communication with a first UE 404a and a second UE 406a. The first base station 402a is a full-duplex base station, whereas the first UE 404a and the second UE 406a may be configured as either a half-duplex UE or a full-duplex UE. The second UE 406a may transmit a first uplink signal to the first base station 402a as well as to other base stations, such as a second base station 408a in proximity to the second UE 406a. The first base station 402a transmits a downlink signal to the first UE 404a concurrently with receiving the uplink signal from the second UE 406a. The base station 402a may experience self-interference at the receiving antenna that is receiving the uplink signal from UE 406a due to receiving some of the downlink signal being transmitted to the UE 404a. The base station 402a may experience additional interference due to signals from the second base station 408a. Interference may also occur at the first UE 404a based on signals from the second base station 408a as well as from uplink signals from the second UE 406a.

Figure 4C:
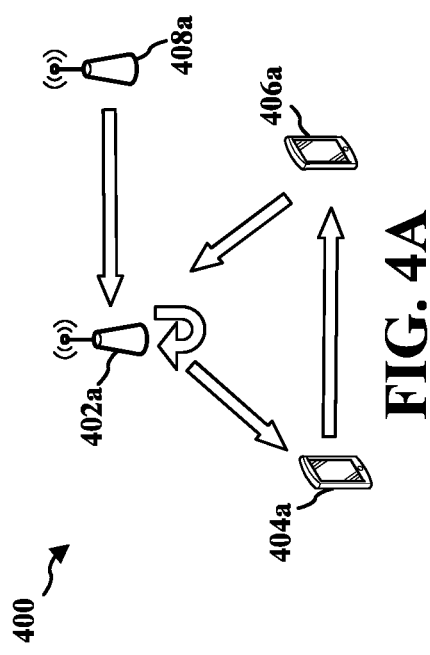
Figure 4B:
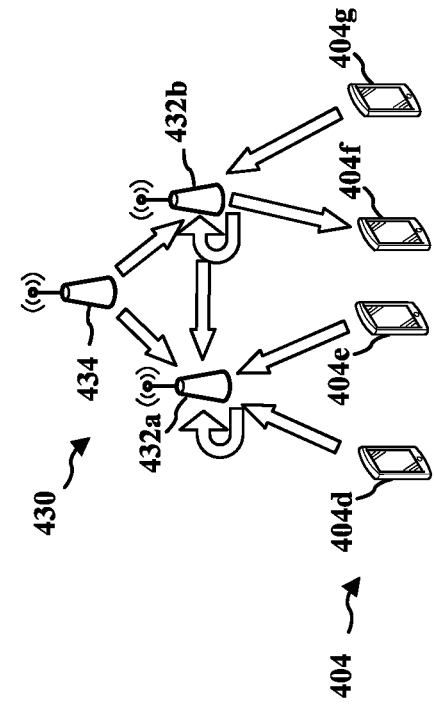

FIG. 4B shows a second example of full-duplex communication 410 in which a first base station 402b is in full-duplex communication with a first UE 404b. In this example, the first base station 402b is a full-duplex base station and the first UE 404b is a full-duplex UE. The first base station 402b and the first UE 404b that can concurrently receive and transmit communication that overlaps in time in a same frequency band. The base station 402b and the UE 404b may each experience self-interference, in which a transmitted signal from the device is leaked to a receiver at the same device. The first UE 404b may experience additional interference based on one or more signals emitted from a second UE 406b and/or a second base station 408b in proximity to the first UE 404b. Additionally, the uplink transmissions from the first UE 404b may cause interference to the second UE 406b receiving downlink signals from the first base station 402b and/or the second base station 408b.

FIG. 4C shows a third example of full-duplex communication 420 in which a first UE 404c is a full-duplex UE in communication with a first base station 402c and a second base station 408c. The first base station 402c and the second base station 408c may serve as multiple transmission and reception points (multi-TRPs) for UL and DL communication with the UE 404c. The second base station 408c may be in communication with a second UE 406c. In FIG. 4C, the first UE 404c may concurrently transmit an uplink signal to the first base station 402c while receiving a downlink signal from the second base station 408c. The first UE 404c may experience self-interference as a result of the first signal and the second signal being communicated simultaneously, e.g., the uplink signal may leak to, e.g., be received by, the UE's receiver. The first UE 404c may experience additional interference from the second UE 406c. Additionally, the uplink transmissions from the first UE 404c may cause interference to the second UE 406c receiving downlink signals from the first base station 402c and/or the second base station 408c.

Figure 4D:
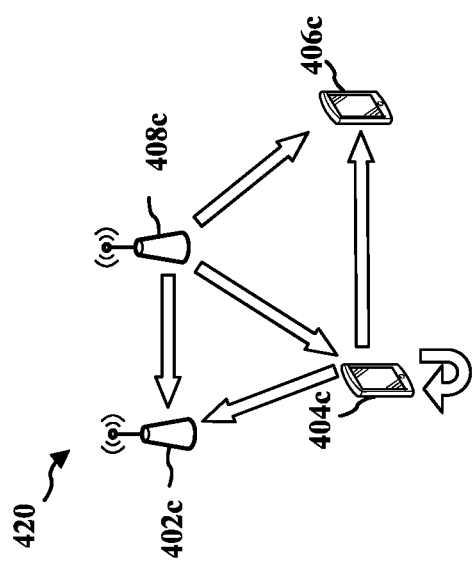

FIG. 4D shows a fourth example of full-duplex communication 430 in which one or more integrated access and backhaul (IAB) nodes 432a, 432b are a full-duplex devices in communication with an JAB parent node 434 and one or more UEs 404. Each full-duplex JAB node 432a, 432b may experience self-interference, for example, from downlink transmissions to the UEs 404 (e.g., UEs 404d, 404e, 404f, 404g) leaking into uplink signals from the UEs 404 or downlink signals from the JAB parent node 434. Additionally, a full-duplex IAB node 432a may experience interference from downlink transmission of the JAB node 432b to UEs 404 or uplink transmissions of the JAB node 432b to the parent IAB node 434.

Figure 5:
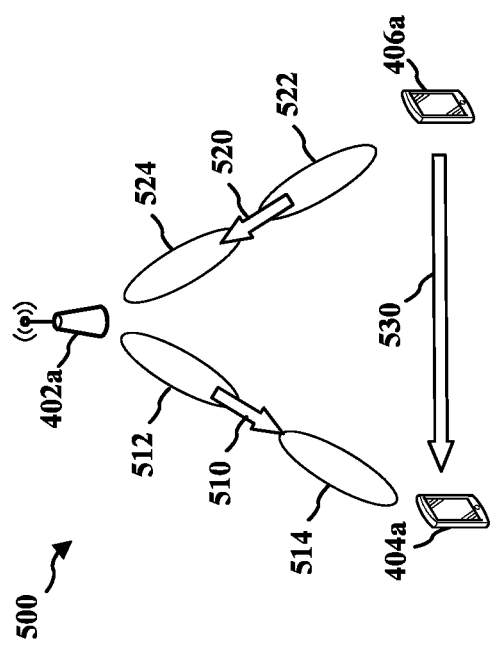
FIG. 5 illustrates an example of cross-link interference (CLI) measurement in the presence of full-duplex communication, in accordance with certain aspects of the present description.

FIG. 5 illustrates an example 500 of CLI measurement in the presence of full-duplex communication. For example, the base station 402a may be a full-duplex base station as in FIG. 4A and communicate with a first UE 404a and a second UE 406a. The first UE 404a may receive a downlink signal 510 that is transmitted on a Tx beam 512 and received on a Rx beam 514. Concurrently, the second UE 406a may transmit an uplink signal 520 on a Tx beam 522, which is received by the base station 402a on a receive beam 524. The uplink signal 520 may cause CLI 530 to the downlink signal 510 at the first UE 404a, which may be referred to as a victim UE.

The UE 404a may be configured with measurement resources for measuring the CLI 530. For example, the measurement resources may correspond to an SRS transmitted by the UE 406a. Conventionally, however, the UE Rx beam for CLI measurement may be up to UE implementation. For example, the UE 404a may measure the CLI 530 using the Rx beam 514. The UE 404a may report the CLI to the base station 402a, but the base station 402a may have no indication of what Rx beam the UE 404a used for the measurement. For example, if the Rx beam 514 experiences strong CLI, the UE 404a may not measure other Rx beams that may experience less CLI. Accordingly, the reported CLI measurements may not be particularly useful for selecting Rx beams that mitigate CLI.

Figure 6:
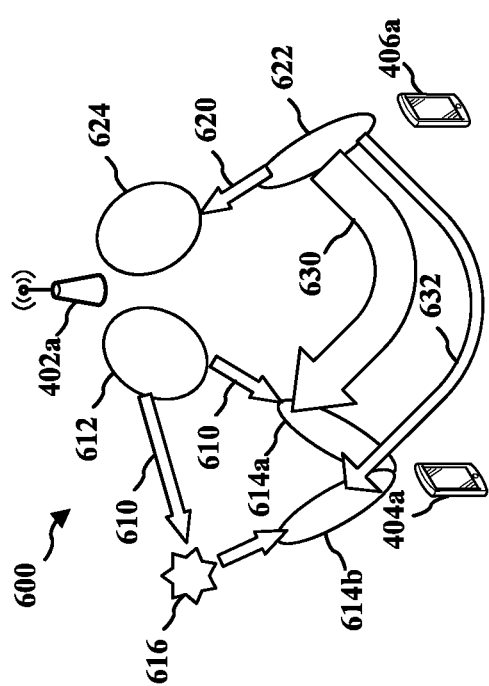
FIG. 6 illustrates an example of CLI measurement using multiple receive beams in the presence of full-duplex communication, in accordance with certain aspects of the present description.

FIG. 6 illustrates an example 600 of CLI measurement using multiple Rx beams in the presence of full-duplex communication. For example, the base station 402a may be a full-duplex base station as in FIG. 4A and communicate with a first UE 404a and a second UE 406a. The first UE 404a may receive a downlink signal 610 that is transmitted on a Tx beam 612 and received on a Rx beam 614a. The first UE 404a may also have a candidate Rx beam 614b that may receive the downlink signal 610 via a path including a cluster 616. Concurrently, the second UE 406a may transmit an uplink signal 620 on a Tx beam 622, which is received by the base station 402a on a receive beam 624. The uplink signal 620 may cause CLI 630 or CLI 632 to the downlink signal 610 at the first UE 404a depending on the Rx beam of the UE 404a.

The UE 404a may be configured with measurement resources for measuring the CLI 630 and CLI 632. For example, the measurement resources may correspond to an SRS transmitted by the UE 406a on the Tx beam 622. The configuration of the measurement resources may specify the Rx beams 614a and 614b by associating a quasi-co-location (QCL) information with each measurement resource. The UE 404a may use the QCL information to separately measure the CLI 630 for Rx beam 614a and the CLI 632 for Rx beam 614b. The UE 406a may be configured to transmit the reference signal (e.g., SRS) using the same Tx beam 622 and/or SRS port. In the illustrated example, the Rx beam 614b may experience less CLI than the Rx beam 614a. The UE 404a may report the measured interference metrics and the QCL associated with each measurement resource to the base station 402a. The different reported interference metrics may allow the base station 402a to select beams that mitigate CLI, which may be in addition to other CLI mitigation techniques such as scheduling.

Figure 7:
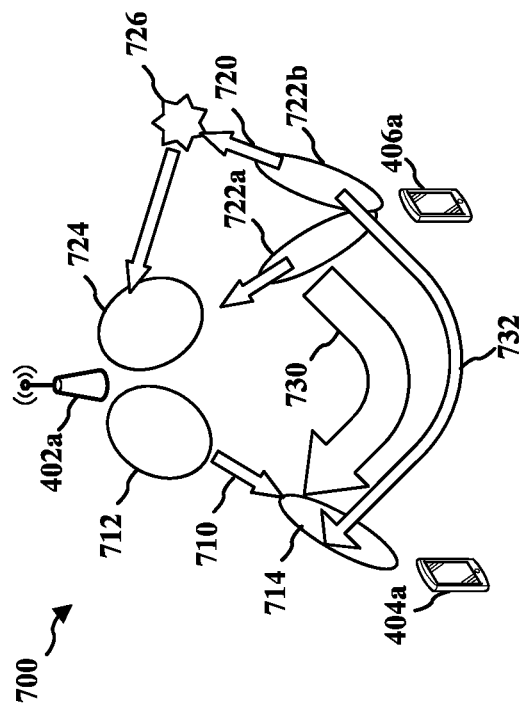
FIG. 7 illustrates an example of CLI measurement using multiple transmit beams in the presence of full-duplex communication, in accordance with certain aspects of the present description.

FIG. 7 illustrates an example 700 of CLI measurement using multiple Tx beams in the presence of full-duplex communication. For example, the base station 402a may be a full-duplex base station as in FIG. 4A and communicate with a first UE 404a and a second UE 406a. The first UE 404a may receive a downlink signal 710 that is transmitted on a Tx beam 712 and received on a Rx beam 714. Concurrently, the second UE 406a may transmit an uplink signal 720 on a Tx beam 722a, which is received by the base station 402a on a receive beam 724. The second UE 406a may have a candidate beam 722b that can reach the base station 402a via a different path including a cluster 726. The uplink signal 720 may cause CLI 730 or CLI 732 to the downlink signal 710 at the first UE 404a depending on the Tx beam of the UE 406a.

The UE 404a may be configured with measurement resources for measuring the CLI 730 and CLI 732. For example, the measurement resources may correspond to an SRS transmitted by the UE 406a on the Tx beams 722a and 722b. The configuration of the measurement resources may specify the Rx beams 714 by associating the same QCL information with each measurement resource. The UE 404a may use the QCL information to separately measure the CLI 730 for Tx beam 722a and the CLI 732 for Tx beam 722b. The UE 406a may be configured to transmit the reference signal (e.g., SRS) using the Tx beams 722a and 722b on different measurement resources. For example, each Tx beam 722a, 722b may be associated with a different SRS port. In the illustrated example, the Tx beam 722b may generate less CLI than the Tx beam 722a. The UE 404a may report the measured interference metrics and the QCL associated with each measurement resource to the base station 402a. The different reported interference metrics may allow the base station 402a to select beams that mitigate CLI, which may be in addition to other CLI mitigation techniques such as scheduling.

Figure 8:
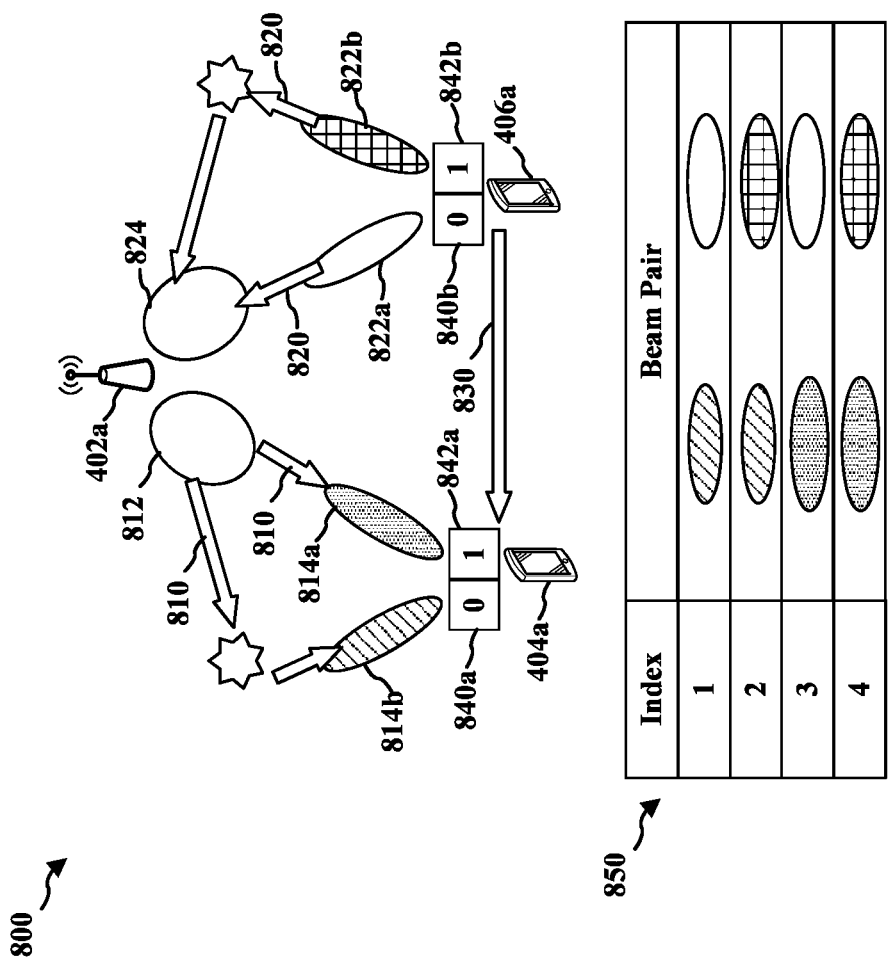
FIG. 8 illustrates an example of CLI measurement using multiple beams and multiple panels in the presence of full-duplex communication, in accordance with certain aspects of the present description.

FIG. 8 illustrates an example 800 of CLI measurement using multiple beams and multiple panels 840a, 842a in the presence of full-duplex communication. Generally, a panel may be a component of a UE or base station including an antenna group including one or more antennas and associated with a panel ID. An antenna may include one or more antennas, antenna elements, and/or antenna arrays. Each panel may operate with a degree of independence. Each panel may be configured with a different panel identifier (panel ID). In an aspect, a panel may be associated with an antenna group. In an aspect, a panel may be a unit of an antenna group to control beams independently. The selection of a panel at the UE may have a similar effect to selection of a beam. The Tx beam or the Rx beam to be used may be specified via a configuration of reference signals (e.g., SRS configuration) for uplink or CSI-RS configuration for downlink. The panel 840a, 842a to use for measurements, however, may be up to UE implementation. For CLI measurement, the interference metrics may be relevant to a beam pair selected by the victim UE and the aggressor UE.

For example, the UE 404a may be configured with a DL RS (e.g., QCL information) for measuring CLI 830. If the victim UE 404a includes two panels 840a and 842a, the DL RS may be associated with a first Rx beam 814a and a second Rx beam 814b for receiving DL signal 810 from DL Tx beam 812. Similarly, the aggressor UE 404b may be configured with a DL RS (e.g., SRS configuration). If the aggressor UE 406a includes two panels 840b, 842b, the DL RS may be associated with a first Tx beam 822a and a second Tx beam 822b for transmitting UL signal 820 to be received on UL Rx beam 824. Table 850 illustrates the different possible beam combinations using the same DL RS but different panels.

In an aspect, a CLI measurement may be identified by both a beam indication RS and a UE panel identifier. For example, each measurement resource for CLI 830 may be associated with a beam indication RS and a UE panel identifier for both transmit and receive sides. The UE panel identifier may be, for example, a panel ID, an antenna group ID, or an SRS resource set ID where each set is mapped to a panel and each SRS resource within the set is mapped to a beam of the panel. For instance, at the aggressor UE 406a using a panel ID, the Tx beams 822a and 822b may be transmitted on SRS resources whose beams are indicated by the same DL RS plus a panel ID (e.g., 0 or 1). At the aggressor UE 406a using an SRS resource set, the Tx beams 822a and 822b may be transmitted on SRS resources that have a same beam indication RS and are in different SRS resource sets mapped to panel ID 0 (panel 840b) and panel ID 1 (panel 842b). At the victim UE 404a using a panel ID, the Rx beams 814a and 814b may be indicated by the same QCL information (e.g., QCL-TypeD RS) plus a panel ID (e.g., 0 or 1). At the victim UE 404a using an SRS resource set ID, the QCL information for the Rx beams 814a and 814b may be mapped to SRS resources that have the same beam indication RS, but are in different SRS sets mapped to panel ID 0 (panel 840a) or panel ID 1 (panel 842a).

Figure 9:
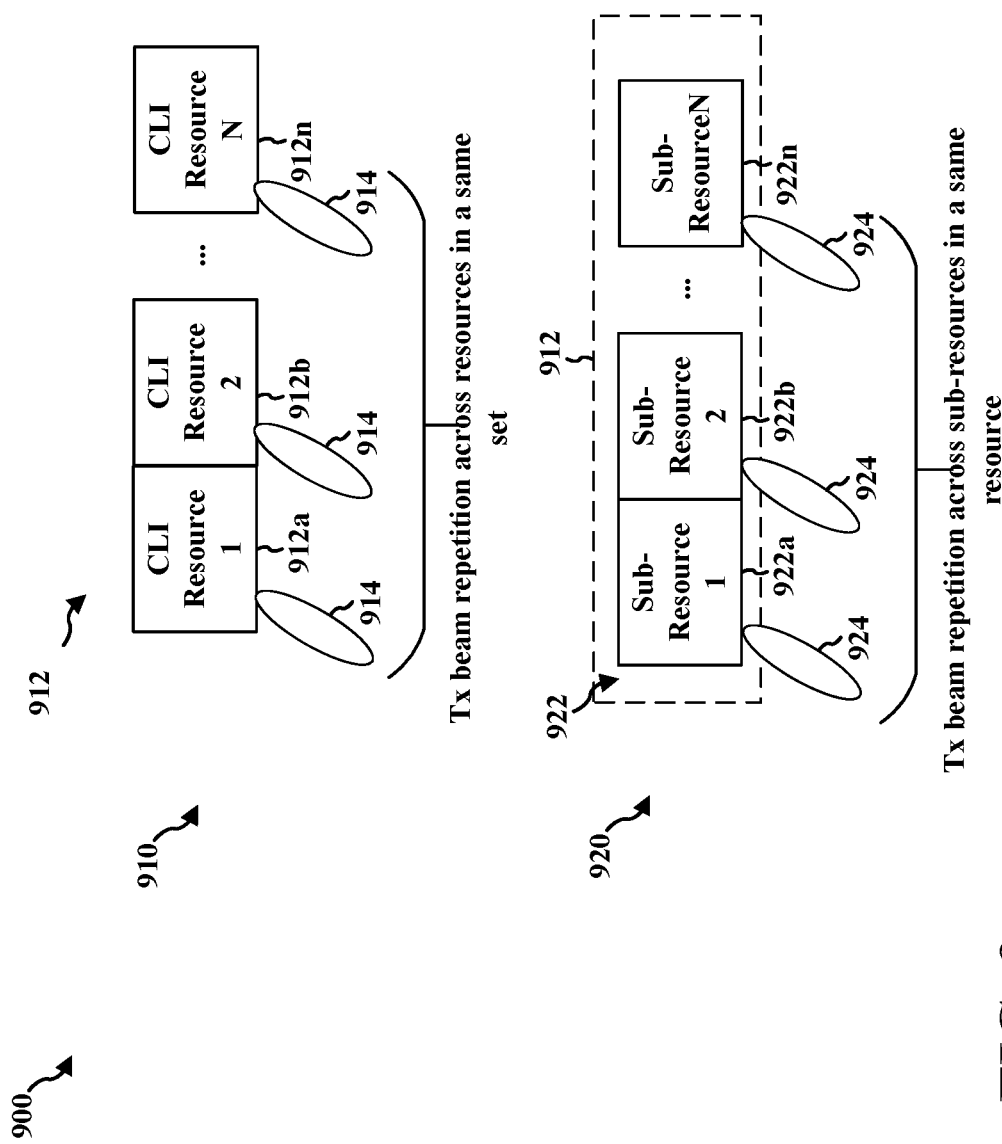
FIG. 9 is a diagram 900 illustrating examples of transmit beam repetition on the same port, in accordance with certain aspects of the present description.

FIG. 9 is a diagram 900 illustrating examples of transmit beam repetition on the same port. Repetition of the transmit beam on the same port may allow a receiving device to compare measured CLI from the same port on different receive beams. Conventionally, each SRS resource may be associated with one symbol and one port, but the base station does not specify whether CLI resources are from the same port.

In a first example 910, the base station may indicate for an aggressor UE 406a to transmit SRS using the same port over measurement resources 912 (e.g., 912a, 912b, . . . , 912n) configured for CLI measurement by the victim UE 404. For example, the base station may transmit an RRC message (e.g., an SRS configuration) including a parameter indicating whether SRS repetition is On or Off for each measurement resource. If the repetition parameter is set to On, each SRS resource in the configured SRS resource set may be transmitted with the same spatial filter and port. Accordingly, the victim UE 404a may receive the same beam 914 on each measurement resource 912.

In a second example 920, the base station may indicate for an aggressor UE 406a to transmit SRS on multiple sub-resources 922 (e.g., symbols 922a, 922b, 922n) of a measurement resource 912 using the same port. The base station may also configure the aggressor UE 406a for no hopping (e.g., R=N_symbol) such that the same port is transmitted on the same set of subcarriers per symbol without hopping across symbols. Accordingly, the victim UE 404a may receive the same beam 924 on each measurement sub-resource 922.

In an aspect, the SRS may be configured to mimic uplink transmissions such as PUSCH and PUCCH such that CLI measurements may be used by the base station in making beam selection and scheduling decisions for future slots. In general, the power control and Tx power for SRS are different from PUSCH. For example, PUSCH transmission power may be represented by the following expression.

$$P_{PUSCH,b,f,c}(i, j, q_d, l) = \min \begin{Bmatrix} P_{CMAX,f,c}(i), \\ P_{O\_PUSCH,b,f,c}(j) + 10 \log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix} [dBm]$$

For comparison, SRS power may be represented by the following expression.

$$P_{SRS,b,f,c}(i, q_s, l) = \min \begin{Bmatrix} P_{CMAX,f,c}(i), \\ P_{O\_SRS,b,f,c}(q_s) + 10 \log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{Bmatrix} [dBm]$$

The SRS power control adjustment h(•) may be adapted to mimic PUSCH power control. For example, h(•) may equal f(•) if srs-PowerControlAdjustmentStates indicates a same power state for both SRS and PUSCH, but may otherwise vary. In an aspect, the SRS power control adjustment may be configured to re-use a PUCCH closed loop index instead of a PUSCH closed loop index. Accordingly, in an aspect, the present disclosure provides for CLI measurements that mimic interference from PUCCH transmissions.

Figure 10:
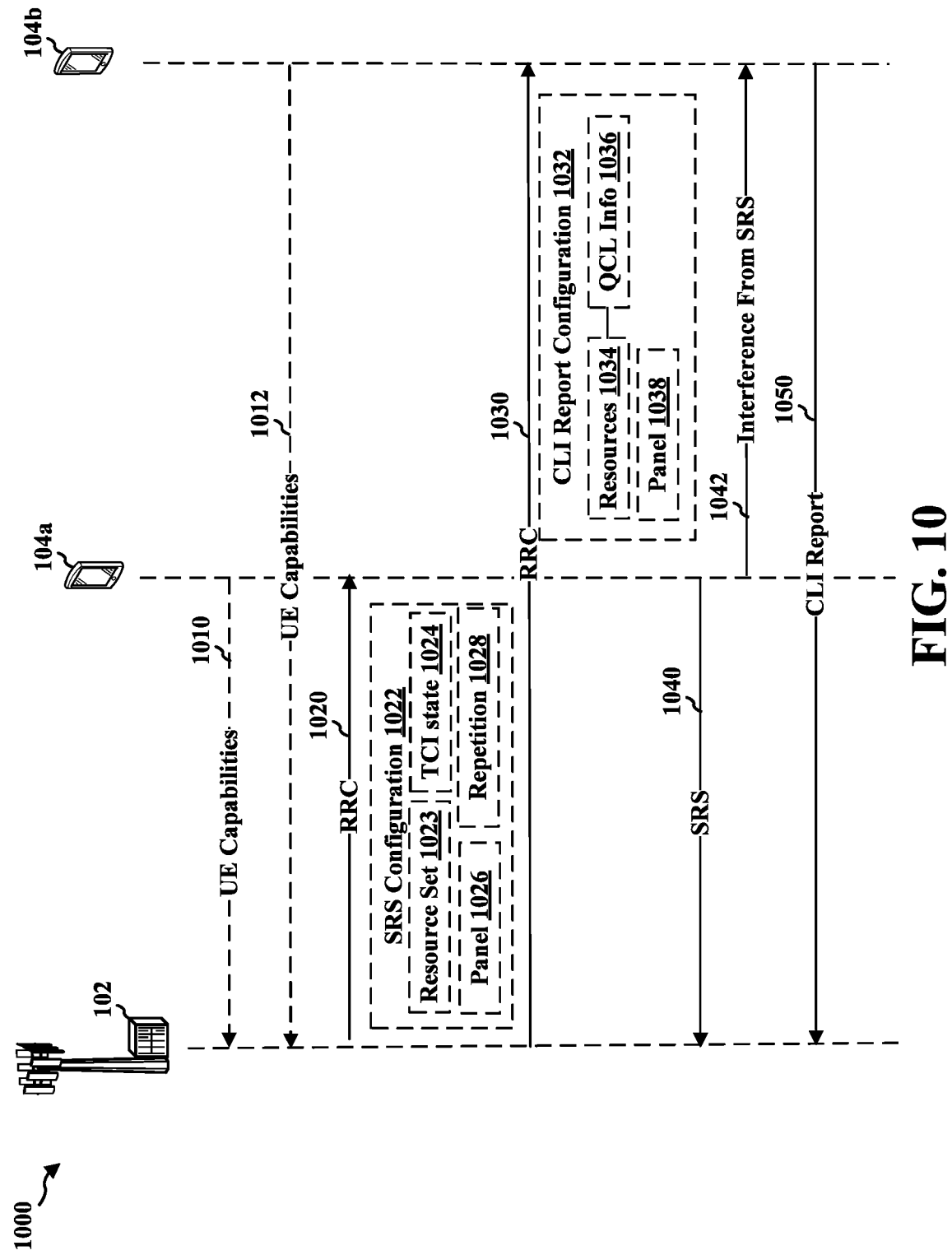
FIG. 10 is a message diagram illustrating example messages for CLI reporting for multiple beams, in accordance with certain aspects of the present description.

FIG. 10 is a message diagram 1000 illustrating example messages for CLI reporting for multiple beams. A base station 102 may be a serving base station for an aggressor UE 104a and a victim UE 104b. Both the aggressor UE 104a and the victim UE 104b may transmit UE capabilities 1010, 1012 indicating the respective capabilities of the UE 104 with respect to CLI reporting. The base station 102 configure the aggressor UE 104a via RRC signaling 1020 with an SRS configuration 1022. For example, the SRS configuration 1022 may indicate an SRS resource set 1023, a TCI state 1024, a panel 1026, and/or a repetition parameter 1028. The base station 102 may configure the victim UE 104b via RRC signaling 1022 carrying a CLI report configuration 1032. For example, the CLI report configuration 1032 may include one or more parameters of the configuration for CLI reporting such as measurement resources 1034, associated QCL information 1036, and/or panel 1038. The aggressor UE 104a may transmit an SRS 1040 based on the SRS configuration 1022. The victim UE 104b may receive the SRS 1040 as interference 1042. The victim UE 104b may measure the interference 1042 from the SRS 1040 on the measurement resources. The victim UE 104b may generate a CLI report 1050 based on the interference metrics and the CLI report configuration 1032.

Figure 11:
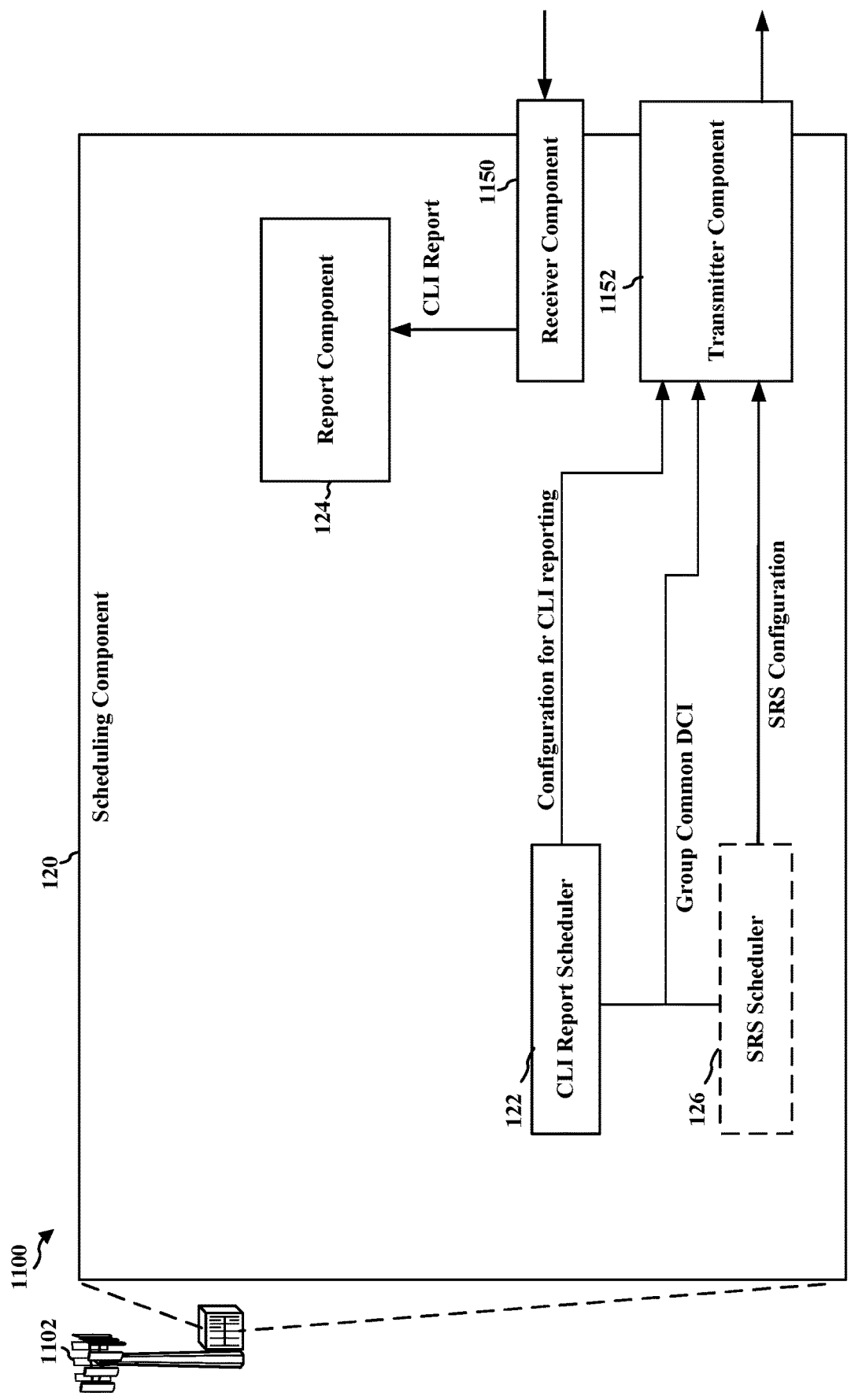
FIG. 11 is a conceptual data flow diagram illustrating the data flow between different means/components in an example BS, in accordance with certain aspects of the present description.

FIG. 11 is a conceptual data flow diagram 1100 illustrating the data flow between different means/components in an example base station 1102, which may be an example of the base station 102 including the scheduling component 120. The scheduling component 120 may include the CLI report scheduler 122 and the report component 124. The scheduling component 120 may optionally include the SRS scheduler 126.

The base station 1102 may also may include a receiver component 1150 and a transmitter component 1152. The receiver component 1150 may include, for example, a RF receiver for receiving the signals described herein. The transmitter component 1152 may include for example, an RF transmitter for transmitting the signals described herein. In some implementations, the receiver component 1150 and the transmitter component 1152 may be co-located in a transceiver such as the Tx/Rx 318 in FIG. 3.

The receiver component 1150 may receive uplink signals from multiple UEs 104. For example, the receiver component 1150 may receive an SRS from the aggressor UE 104*a* and a CLI report from the victim UE 104*b*. The receiver component 1150 may provide the CLI report to the report component 124.

The CLI report scheduler 122 may configure the one or more victim UEs to measure CLI based on a scheduled SRS transmission. In some implementations, the CLI report scheduler 122 may receive an indication of SRS scheduling from the SRS scheduler 126. The CLI report scheduler 122 may configure the one or more victim UEs to transmit a CLI report 1050 based on the measured CLI. In particular, the CLI report scheduler 122 may transmit the CLI report configuration 1032 indicating one or more properties of the CLI report as described herein. For example, the CLI report configuration 1032 may identify a QCL information 1036 corresponding to each measurement resource 1034. The panel 1038 may be identified by one of a panel ID, antenna group ID, or SRS resource set ID. In some implementations, the CLI report configuration may indicate a panel 1038 for each measurement resource. The CLI report may be associated with one or more CSI-IM resource sets corresponding to an SRS transmission of an aggressor UE 104*a*.

The SRS scheduler 126 may receive an indication of the CLI measurement resources from the CLI report scheduler 122. The SRS scheduler 126 may be configured to transmit, to one or more aggressor UEs, an SRS configuration 1022 corresponding to a plurality of CLI measurement resources for a victim UE. For example, the SRS scheduler 126 may transmit an SRS configuration 1022 as RRC signaling 1020 via the transmitter component 1152. The SRS configuration may identify an SRS resource set 1023, TCI state 1024 spatial relation parameter, and a panel 1026 for SRS transmission corresponding to each CLI measurement resource. In some implementations, the SRS configuration includes an SRS resource set 1023 including a plurality of SRS resources transmitted with a same spatial filter and port. For instance, the SRS configuration may be an RRC message that indicates repetition 1028 of an SRS signal per SRS resource set. In some implementations, the SRS configuration includes an SRS resource including multiple symbols corresponding to different receive beams of the victim UE and the SRS transmission is configured for no hopping across frequency. In some implementations, the SRS configuration 1022 indicates an SRS transmission power based on a closed loop index for a physical uplink control channel.

The report component 124 may receive a CLI report 1050 from one or more victim UEs 104. The CLI report 1050 may include reported interference metrics for a subset of the measurement resources and associated QCL information corresponding to the reported interference metrics. The interference metrics may include a L1 SRS RSRP or L1 CLI RSSI. In some implementations, the report component 124 may determine effects of cross-link interference on the victim UEs. For example, the report component 124 may identify candidate beams for either the aggressor UE or victim UE based on the CLI report. In some implementations, the report component 124 may adjust scheduling based on the CLI reports.

Figure 12:
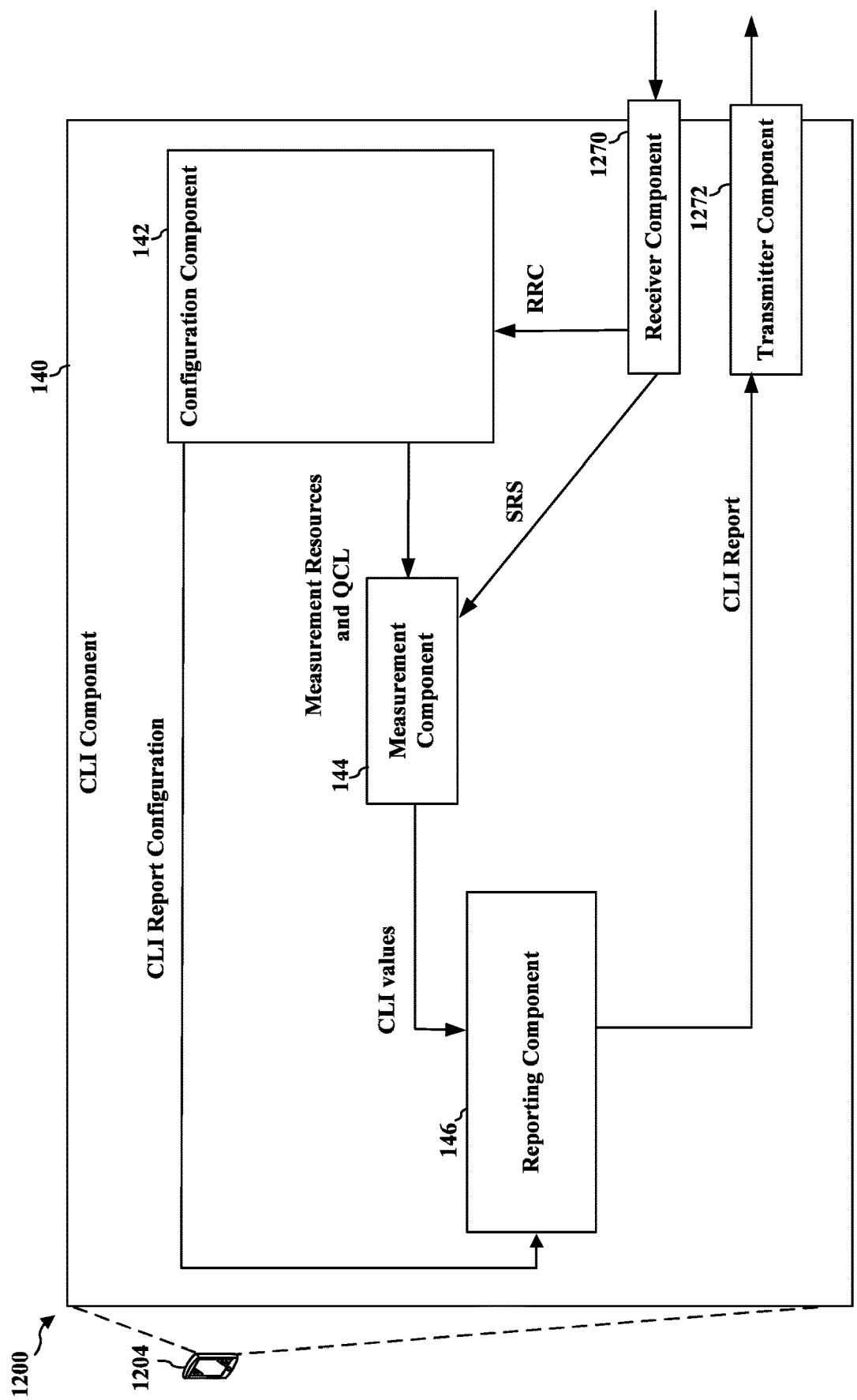
FIG. 12 is a conceptual data flow diagram illustrating the data flow between different means/components in an example victim UE, in accordance with certain aspects of the present description.

FIG. 12 is a conceptual data flow diagram 1200 illustrating the data flow between different means/components in an example UE 1204, which may be an example of the UE 104 (e.g., victim UE 104*b*) and include the CLI component 140.

As discussed with respect to FIG. 1, the CLI component 140 may include the configuration component 142, the measurement component 144, and the reporting component 146. The UE 104 also may include a receiver component 1270 and a transmitter component 1272. The receiver component 1270 may include, for example, a radio-frequency (RF) receiver for receiving the signals described herein. The transmitter component 1272 may include for example, an RF transmitter for transmitting the signals described herein. In some implementations, the receiver component 1270 and the transmitter component 1272 may be co-located in a transceiver.

The receiver component 1270 may receive downlink signals such as the RRC signaling 1030. The receiver component 1270 may receive cross-link interference such as interference 1042 from the SRS 1040. The receiver component 1270 may provide the RRC signaling 1030 to the configuration component 142. The receiver component 1270 may provide the SRS 1040 to the measurement component 144.

The configuration component 142 may receive the RRC signaling 1030 from the receiver component 1270. The configuration component 142 may extract RRC configured parameters from the RRC signaling 1030, for example, by decoding the RRC signaling. For example, the configuration component 142 may extract parameters of the CLI report configuration 1032 such as measurement resources 1034 and the QCL information 1036 associated with each measurement resource. In some implementations, the parameters may define a rule for which measurement resources to report. For example, the parameters may define a number of lowest interference metrics, a threshold interference metric, or an indication of whether the UE is to report a best beam. The parameters may define the interference metric to report such as L1 SRS RSRP and/or L1 CLI RSSI. The configuration component 142 may provide the CLI report configuration parameters to the reporting component 146. The configuration component 142 may determine the resources to measure and the beams corresponding to the QCL information. In some implementations, the configuration component 142 may determine the panel to use for each measurement resource. The configuration component 142 may provide the measurement resources, associated beams, and/or panels to the measurement component 144.

The measurement component 144 may receive the measurement resources, QCL information, and/or panels from the configuration component 142. The measurement component 144 may perform measurements on the measurement resources. The base station 102 may refrain from transmitting on the measurement resources, so any signal received on the measurement resources may be considered cross-link interference. In an aspect, the measurement component 144 may measure a L1 RSSI to capture the amount of CLI. In some implementations, the measurement component 144 may measure an L1 RSRP to determine the CLI from a specific aggressor UE 104*a*. The measurement component 144 may provide CLI values to the reporting component 146.

The reporting component 146 may transmit a CLI report based on the CLI report configuration and the measurements. For example, the reporting component 146 may determine a subset of the interference metrics associated with reported measurement resources. For example, the subset may include a configured number of lowest interference metrics. The reporting component 146 may determine the information to include for each measurement resource such as the QCL information associated with the reported measurement resources. The reporting component 146 may determine uplink resources for the CLI report based on the CLI report configuration. The reporting component 146 may transmit the CLI report via the transmitter component 1272.

Figure 13:
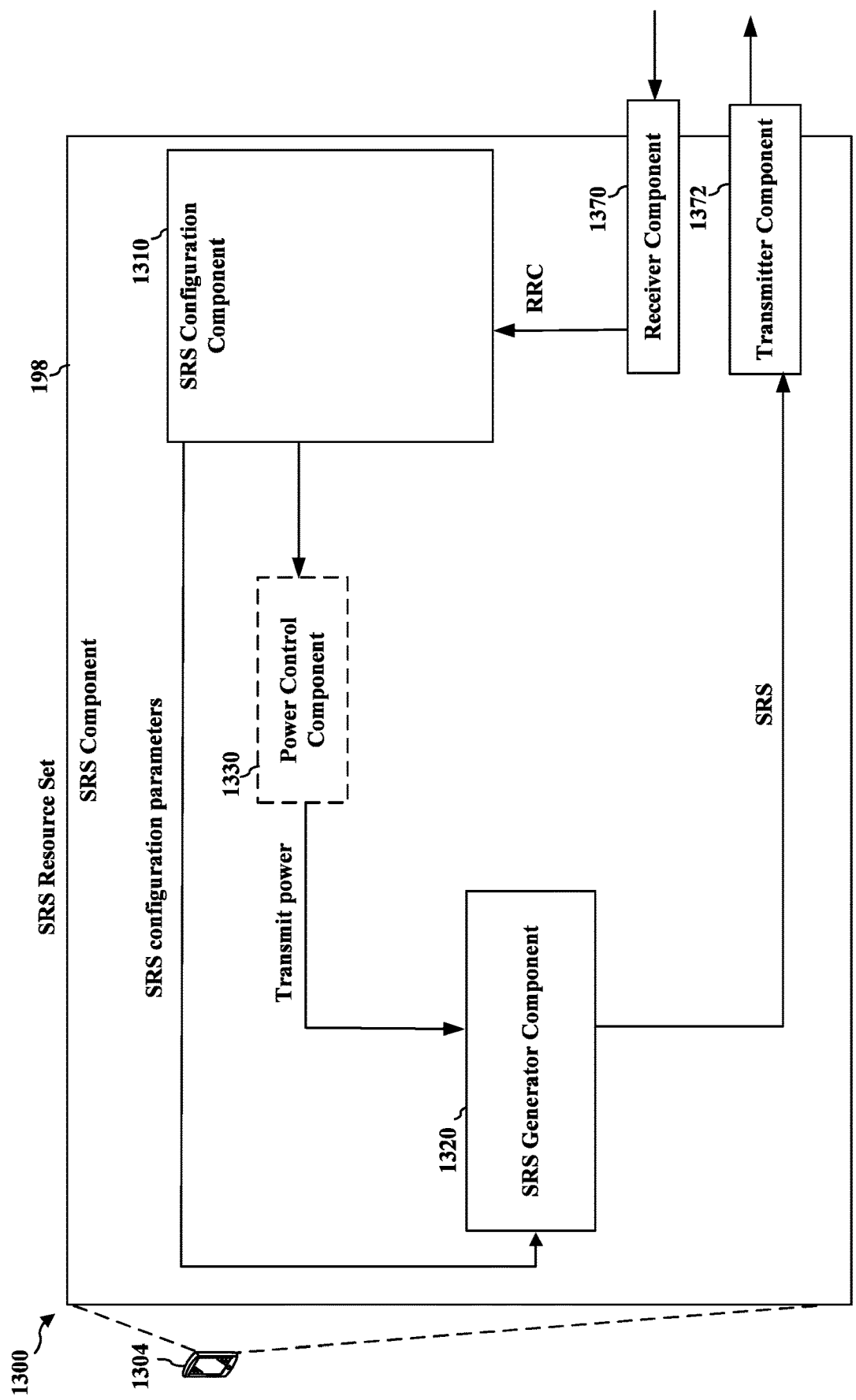
FIG. 13 is a conceptual data flow diagram illustrating the data flow between different means/components in an example aggressor UE, in accordance with certain aspects of the present description.

FIG. 13 is a conceptual data flow diagram 1300 illustrating the data flow between different means/components in an example UE 1304, which may be an example of the UE 104 (e.g., victim UE 104*a*) and include the SRS component 198. The UE 1304 also may include a receiver component 1370 and a transmitter component 1372. The receiver component 1370 may include, for example, a RF receiver for receiving the signals described herein. The transmitter component 1372 may include for example, an RF transmitter for transmitting the signals described herein. In some implementations, the receiver component 1370 and the transmitter component 1372 may be co-located in a transceiver.

The SRS component 198 may include an SRS configuration component 1310 and an SRS generator component 1320. In some implementations, the SRS component 198 may optionally include a power control component 1330.

The receiver component 1270 may receive downlink signals such as the RRC signaling 1020. The receiver component 1270 may provide the RRC signaling 1020 to the SRS configuration component 1310.

The SRS configuration component 1310 may receive, from a base station, an SRS configuration corresponding to a plurality of CLI measurement resources for at least one victim UE, the SRS configuration identifying a TCI state spatial relation parameter and a panel for SRS transmission corresponding to each CLI measurement resource. For example, the SRS configuration component 1310 may receive the RRC signaling 1020 from the receiver component 1370. The SRS configuration component 1310 may decode the RRC signaling 1020 to extract parameters of the SRS configuration 1022. For example, the SRS configuration component 1310 may determine the resource set 1023, the TCI state 1024, the panel 1026, and/or the repetition parameter 1028. The SRS configuration component 1310 may provide the resource set 1023, the TCI state 1024, the panel 1026, and/or the repetition parameter 1028 to the SRS generator component 1320. In some implementations, the SRS configuration may include a power control parameter such as an SRS-PowerControlAdjustmentStates parameter that indicates a type of transmission or closed loop index. The SRS configuration component 1310 may provide the power control parameter to the power control component 1330.

The power control parameter 1330 may receive the power control parameter from the SRS configuration component 1310. The power control component 1330 may determine a transmit power based on the power control parameter. For example, the power control component 1330 may select a transmit power that matches PUSCH or PUCCH transmit power. The power control component 1330 may provide the transmit power to the SRS generator component 1320.

The SRS generator component 1320 may receive the SRS configuration parameters from the SRS configuration component 1310. The SRS generator component 1320 may transmit an SRS using the TCI state spatial relation parameter, the panel, and a same SRS port on the CLI measurement resources. For example, the SRS generator component 1320 may generate an SRS for the SRS resource set corresponding to the CLI measurement resources. The SRS generator component 1320 may transmit the SRS on the indicated panel using the indicated TCI state spatial relation parameter via the transmitter component 1372. In some implementations, the SRS generator component 1320 may transmit the SRS with a transmission power using a closed loop index for a PUCCH.

Figure 14:
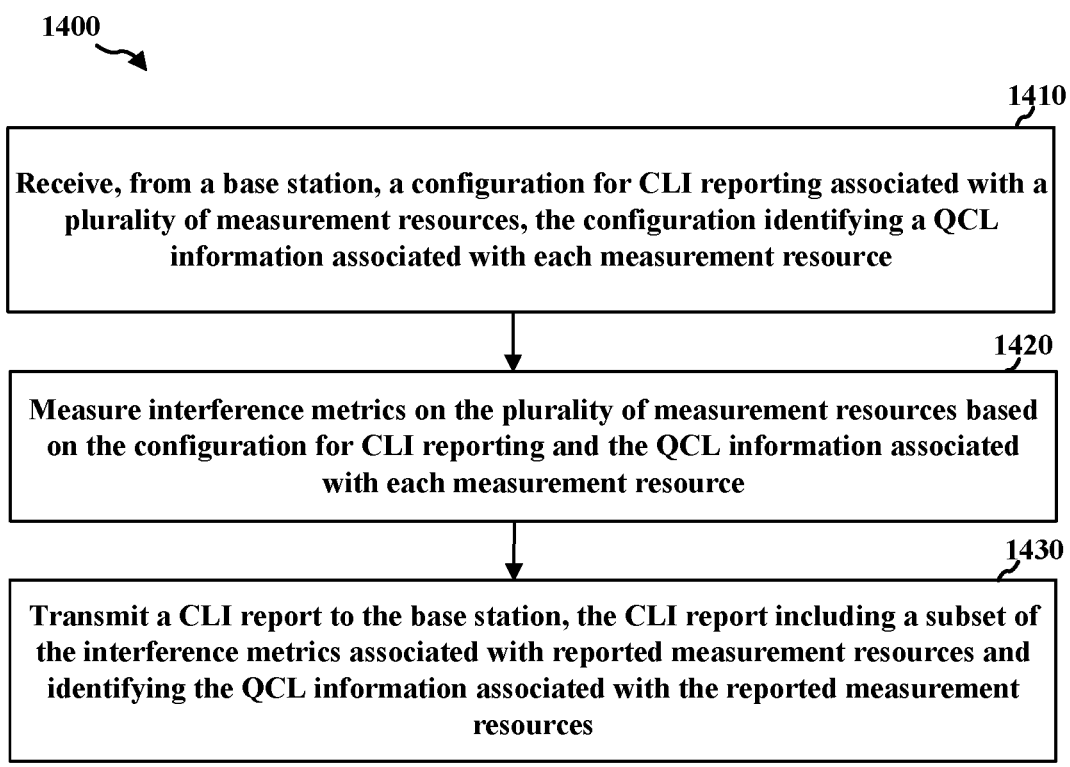
FIG. 14 is a flowchart of an example method of CLI reporting for a UE, in accordance with certain aspects of the present description.

FIG. 14 is a flowchart of an example method 1400 for a victim UE to report CLI. The method 1400 may be performed by a UE (such as the UE 104, which may include the memory 360 and which may be the entire UE 104 or a component of the UE 104 such as the CLI component 140, Tx processor 368, the Rx processor 356, or the controller/processor 359). The method 1400 may be performed by the CLI component 140 in communication with the scheduling component 120 of the base station 102 and/or the SRS component 198 of the aggressor UE 104*a*. Optional blocks are shown with dashed lines.

At block 1410, the method 1400 includes receiving, from a base station, a configuration for CLI reporting associated with a plurality of measurement resources, the configuration identifying a QCL information associated with each measurement resource. In some implementations, for example, the UE 104, the Rx processor 356, or the controller/processor 359 may execute the CLI component 140 or the configuration component 142 to receive, from a base station, a configuration for CLI reporting associated with a plurality of measurement resources, the configuration identifying a QCL information associated with each measurement resource. In some implementations, the configuration for CLI reporting indicates a panel of the victim UE for each measurement resource. In some implementations, the panel is identified by one of a panel ID, antenna group ID, or SRS resource set ID. In some implementations, the configuration for CLI reporting indicates repetition of the SRS signal per SRS resource set. In some implementations, at least one of the measurement resources includes multiple symbols for SRS transmissions that are configured for no hopping across frequency. In some implementations, the measurement resources include an SRS signal transmitted with a transmission power using a closed loop index for a physical uplink control channel. Accordingly, the UE 104, the Rx processor 356, or the controller/processor 359 executing the CLI component 140 or the configuration component 142 may provide means for receiving, from a base station, a configuration for CLI reporting associated with a plurality of measurement resources, the configuration identifying a QCL information associated with each measurement resource.

At block 1420, the method 1400 includes measuring interference metrics on the plurality of measurement resources based on the configuration for CLI reporting and the QCL information associated with each measurement resource. In some implementations, for example, the UE 104, the Rx processor 356, or the controller/processor 359 may execute the CLI component 140 or the measurement component 144 to measure interference metrics on the plurality of measurement resources based on the configuration for CLI reporting and the QCL information associated with each measurement resource. In some implementations, the interference metrics include a L1 SRS RSRP or a L1 CLI RSSI. In implementations where the UE 1204 includes multiple panels (e.g., panels 840*a*, 842*b*), the interference metrics associated with reported measurement resources include a first metric for the QCL information and a first panel and a second metric for the QCL information and a second panel. In some implementations, each measurement resource is associated with a transmit beam and associated a panel of the transmit beam of at least one other UE. In some implementations, the plurality of measurement resources include an SRS resource set including plurality of SRS resources where an SRS signal is transmitted with a same spatial filter and a same port. Accordingly, the UE 104, the Rx processor 356, or the controller/processor 359 executing the CLI component 140 or measurement component 144 may provide means for measuring interference metrics on the plurality of measurement resources based on the configuration for CLI reporting and the QCL information associated with each measurement resource.

At block 1430, the method 1400 may include transmitting a CLI report to the base station, the CLI report including a subset of the interference metrics associated with reported measurement resources and identifying the QCL information associated with the reported measurement resources. In some implementations, for example, the UE 104, the Tx processor 368, or the controller/processor 359 may execute the CLI component 140 or the reporting component 146 to transmit the CLI report to the base station, the CLI report including a subset of the interference metrics associated with reported measurement resources and identifying the QCL information associated with the reported measurement resources. In some implementations, the subset of the interference metrics and the QCL information associated with the reported measurement resources includes a configured number of lowest interference metrics and associated QCL information for each of a plurality of receive beams with a transmit beam repeated by at least one other neighbor transmitting UE on the measurement resources. In some implementations, the subset of the interference metrics and the QCL information associated with the reported measurement resources includes a configured number of lowest interference metrics and associated QCL information for single receive beam repeated with different transmit beams used by at least one other neighbor transmitting UE on the measurement resources. In some implementations, the CLI report represents each interference metric as an indication of whether the interference metric exceeds a threshold. In some implementations, the CLI report indicates a QCL information associated with at least one best beam selected by the UE. Accordingly, the UE 104, the Tx processor 368, or the controller/processor 359 executing the CLI component 140 or the reporting component 146 may provide means for transmitting a CLI report to the base station, the CLI report including a subset of the interference metrics associated with reported measurement resources and identifying the QCL information associated with the reported measurement resources.

Figure 15:
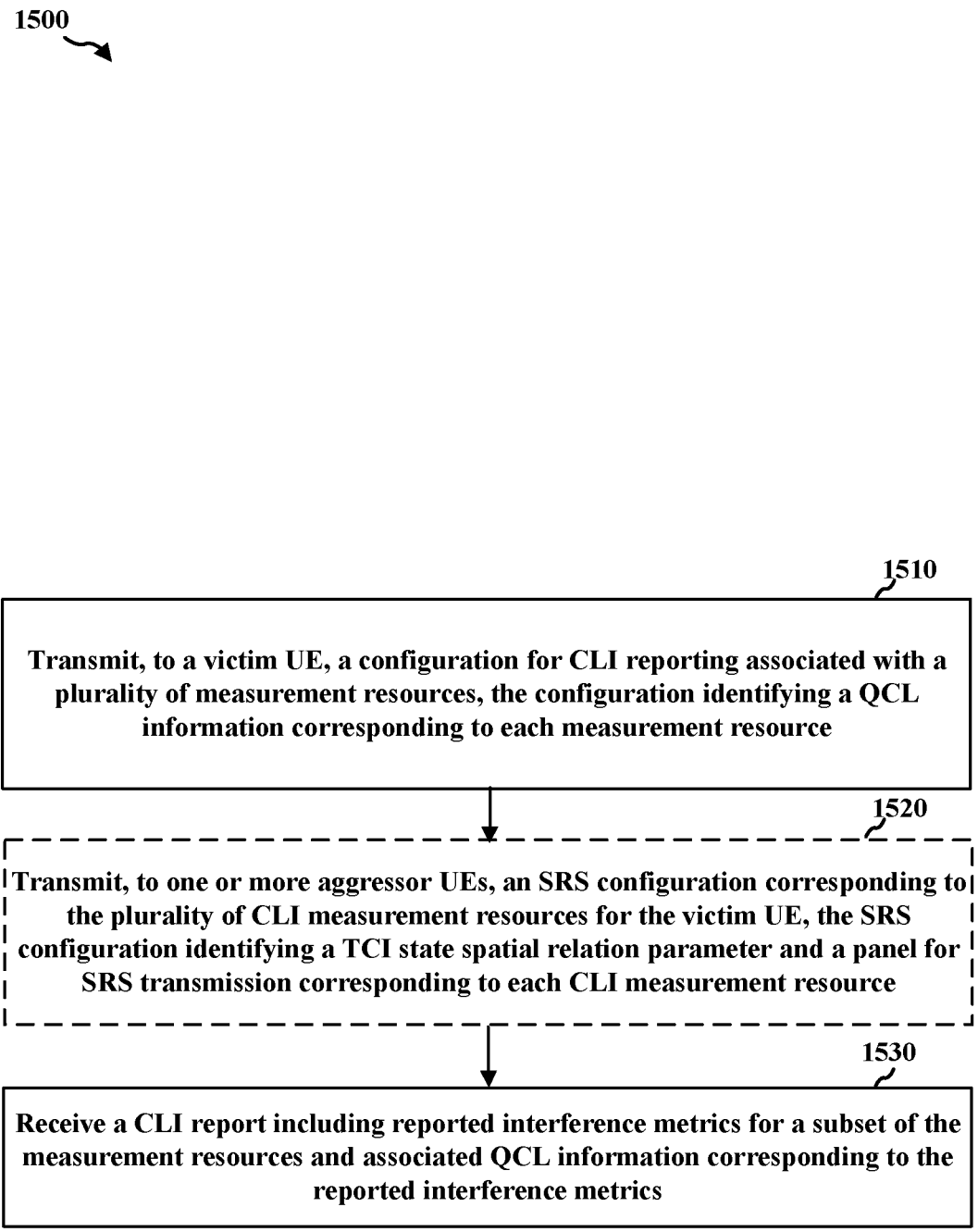
FIG. 15 is a flowchart of an example method of configuring a UEs for CLI reporting based on a transmission of an aggressor UE, in accordance with certain aspects of the present description.

FIG. 15 a flowchart of an example method 1500 for a base station to configure a victim UE for CLI reporting. The method 1500 may be performed by a base station (such as the base station 102, which may include the memory 376 and which may be the entire base station 102 or a component of the base station 102 such as the scheduling component 120, Tx processor 316, the Rx processor 370, or the controller/processor 375). The method 1500 may be performed by the scheduling component 120 in communication with the CLI component 140 of the victim UE 104*b* and the SRS component 198 of the aggressor UE 104*a*.

At block 1510, the method 1500 includes transmitting, to a victim UE, a configuration for CLI reporting associated with a plurality of measurement resources, the configuration identifying a QCL information corresponding to each measurement resource. In some implementations, for example, the base station 102, Tx processor 316, or the controller/processor 375 may execute the scheduling component 120 or the CLI report scheduler to transmit, to a victim UE, a configuration for CLI reporting associated with a plurality of measurement resources, the configuration identifying a QCL information corresponding to each measurement resource. Accordingly, the base station 102, Tx processor 316, or the controller/processor 375 executing the scheduling component 120 or the CLI report scheduler may provide means for transmitting, to a victim UE, a configuration for CLI reporting associated with a plurality of measurement resources, the configuration identifying a QCL information corresponding to each measurement resource.

At block 1520, the method 1500 may optionally include transmitting, to one or more aggressor UEs, an SRS configuration corresponding to the plurality of CLI measurement resources for the victim UE, the SRS configuration identifying a TCI state spatial relation parameter and a panel for SRS transmission corresponding to each CLI measurement resource. In some implementations, for example, the base station 102, Tx processor 316, or the controller/processor 375 may execute the scheduling component 120 or the SRS scheduler 126 to transmit, to one or more aggressor UEs, an SRS configuration corresponding to the plurality of CLI measurement resources for the victim UE, the SRS configuration identifying a TCI state spatial relation parameter and a panel for SRS transmission corresponding to each CLI measurement resource. Accordingly, the base station 102, Tx processor 316, or the controller/processor 375 executing the scheduling component 120 or the SRS scheduler 126 may provide means for transmitting, to one or more aggressor UEs, an SRS configuration corresponding to the plurality of CLI measurement resources for the victim UE, the SRS configuration identifying a TCI state spatial relation parameter and a panel for SRS transmission corresponding to each CLI measurement resource.

At block 1530, the method 1500 may include receiving a CLI report including reported interference metrics for a subset of the measurement resources and associated QCL information corresponding to the reported interference metrics. In some implementations, for example, the base station 102, Rx processor 370, or the controller/processor 375 may execute the scheduling component 120 or the report component 124 to receive a CLI report based on the configuration for CLI reporting. Accordingly, the base station 102, Rx processor 370, or the controller/processor 375 executing the scheduling component 120 or the report component 124 may provide means for receiving a CLI report including reported interference metrics for a subset of the measurement resources and associated QCL information corresponding to the reported interference metrics.

Figure 16:
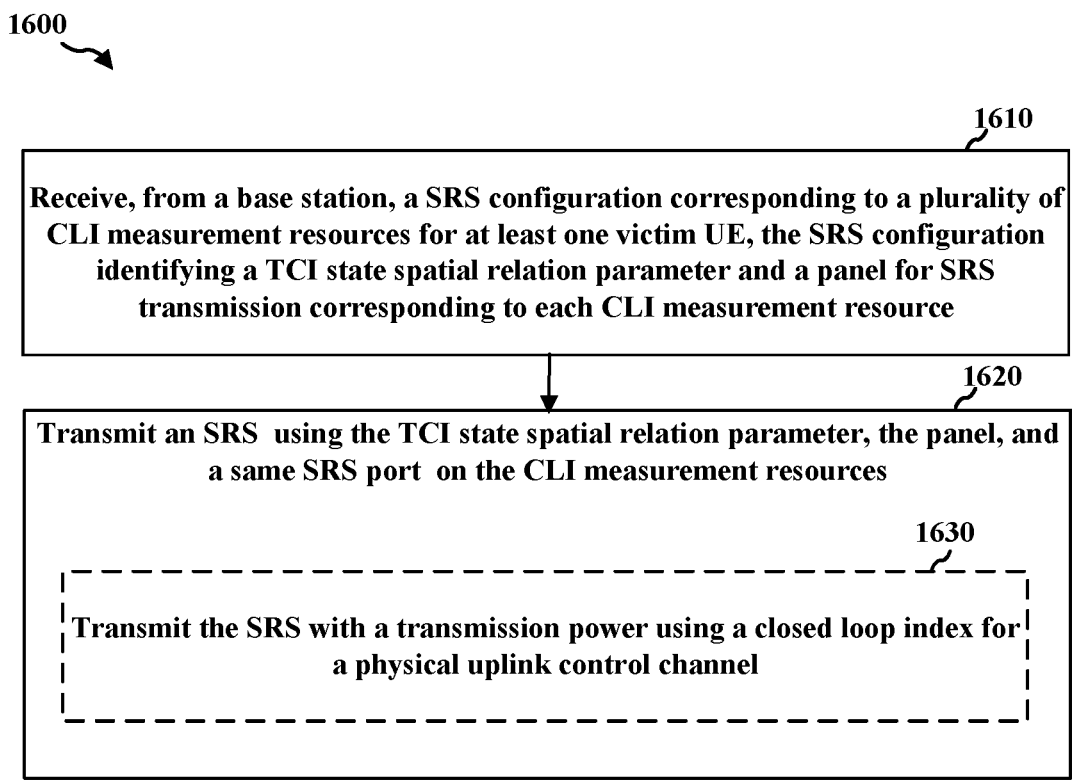
FIG. 16 is a flowchart of an example method of SRS transmission to assist CLI reporting, in accordance with certain aspects of the present description.

FIG. 16 is a flowchart of an example method 1600 for an aggressor UE to assist in measurement of CLI. The method 1600 may be performed by a UE (such as the UE 104*a*, which may include the memory 360 and which may be the entire UE 104 or a component of the UE 104 such as the CLI component 140, Tx processor 368, the Rx processor 356, or the controller/processor 359). The method 1600 may be performed by the SRS component 198 in communication with the scheduling component 120 of the base station 102 and/or the CLI component 140 of the victim UE 104*b*. Optional blocks are shown with dashed lines.

At block 1610, the method 1600 includes receiving, from a base station, an SRS configuration corresponding to a plurality of CLI measurement resources for at least one victim UE, the SRS configuration identifying a TCI state spatial relation parameter and a panel for SRS transmission corresponding to each CLI measurement resource. In some implementations, for example, the UE 104, the Rx processor 356, or the controller/processor 359 may execute the CLI component 140 or the SRS configuration component 1310 to receive, from a base station, an SRS configuration corresponding to a plurality of CLI measurement resources for at least one victim UE, the SRS configuration identifying a TCI state spatial relation parameter and a panel for SRS transmission corresponding to each CLI measurement resource. In some implementations, the panel is identified by one of a panel ID, antenna group ID, or SRS resource set ID. In some implementations, the plurality of CLI measurement resources correspond to an SRS resource set including plurality of SRS resources transmitted with a same spatial filter and port. In some implementations, the SRS configuration is an RRC message that indicates repetition for the SRS resource set. In some implementations, at least one of the CLI measurement resources includes multiple symbols and the SRS transmission is configured for no hopping across frequency. Accordingly, the UE 104, the Rx processor 356, or the controller/processor 359 executing the CLI component 140 or the SRS configuration component 1310 may provide means for receiving, from a base station, an SRS configuration corresponding to a plurality of CLI measurement resources for at least one victim UE, the SRS configuration identifying a TCI state spatial relation parameter and a panel for SRS transmission corresponding to each CLI measurement resource.

At block 1620, the method 1600 may include transmitting an SRS using the TCI state spatial relation parameter, the panel, and a same SRS port on the CLI measurement resources. In some implementations, for example, the UE 104, the Tx processor 368, or the controller/processor 359 may execute the CLI component 140 or the SRS generator component 1320 to transmit an SRS using the TCI state spatial relation parameter, the panel, and a same SRS port on the CLI measurement resources. For example, in sub-block 1630, the block 1620 may include transmitting the SRS with a transmission power using a closed loop index for a physical uplink control channel. Accordingly, the UE 104, the Tx processor 368, or the controller/processor 359 executing the CLI component 140 or the SRS generator component 1320 may provide means for transmitting an SRS using the TCI state spatial relation parameter, the panel, and a same SRS port on the CLI measurement resources.

The following provides an overview of aspects of the present disclosure:

Aspect 1: A method of wireless communication for a victim user equipment (UE), comprising: receiving, from a base station, a configuration for cross-link interference (CLI) reporting associated with a plurality of measurement resources, the configuration identifying a quasi-co-location (QCL) information associated with each measurement resource; measuring interference metrics on the plurality of measurement resources based on the configuration for CLI reporting and the QCL information associated with each measurement resource; and transmitting a CLI report to the base station, the CLI report including a subset of the interference metrics associated with reported measurement resources and identifying the QCL information associated with the reported measurement resources.

Aspect 2: The method of Aspect 1, wherein the subset of the interference metrics and the QCL information associated with the reported measurement resources includes a configured number of lowest interference metrics and associated QCL information for each of a plurality of receive beams with a transmit beam repeated by at least one other neighbor transmitting UE on the plurality of measurement resources.

Aspect 3: The method of Aspect 1, wherein the subset of the interference metrics and the QCL information associated with the reported measurement resources includes a configured number of lowest interference metrics and associated QCL information for a single receive beam repeated with different transmit beams used by at least one other neighbor transmitting UE on the plurality of measurement resources.

Aspect 4: The method of any of Aspects 1-3, wherein the CLI report represents each interference metric as an indication of whether the interference metric exceeds a threshold.

Aspect 5: The method of any of Aspects 1-4, wherein the CLI report indicates a QCL information associated with at least one best beam selected by the UE.

Aspect 6: The method of any of Aspects 1-5, wherein the interference metrics include a layer 1 (L1) sounding reference signal (SRS) reference signal received power (RSRP) or L1 CLI received signal strength indicator (RSSI).

Aspect 7: The method of any of Aspects 1-6, wherein the configuration for CLI reporting indicates a panel of the victim UE for each measurement resource.

Aspect 8: The method of Aspect 7, wherein the panel is identified by one of a panel ID, antenna group ID, or SRS resource set ID.

Aspect 9: The method of Aspect 7 or 8, wherein the interference metrics associated with reported measurement resources include a first metric for the QCL information and a first panel and a second metric for the QCL information and a second panel.

Aspect 10: The method of any of Aspects 7-9, wherein each measurement resource is associated with a transmit beam and a panel associated with the transmit beam of at least one other UE.

Aspect 11: The method of any of Aspects 1-10, wherein the plurality of measurement resources include an SRS resource set including plurality of SRS resources where an SRS signal is transmitted with a same spatial filter and a same port.

Aspect 12: The method of Aspect 11, wherein the configuration for CLI reporting indicates repetition of the SRS signal per SRS resource set.

Aspect 13: The method of any of Aspects 1-12, wherein at least one of the measurement resources includes multiple symbols for SRS transmissions that are configured for no hopping across frequency.

Aspect 14: The method of any of Aspects 1-13, wherein the measurement resources include an SRS signal transmitted with a transmission power using a closed loop index for a physical uplink control channel.

Aspect 15: An apparatus for wireless communication, comprising: a transceiver; a memory storing computer-executable instructions; and a processor coupled with the transceiver and the memory and configured to execute the computer-executable instructions to perform the method of any of clauses 1-14.

Aspect 16: An apparatus for wireless communication, comprising: means for performing the method of any of clauses 1-14.

Aspect 17: A non-transitory computer-readable medium storing computer executable code, the code when executed by a processor causes the processor to perform the method of any of clauses 1-14.

Aspect 18: A method of wireless communication for a base station, comprising: transmitting, to a victim UE, a configuration for cross-link interference (CLI) reporting associated with a plurality of measurement resources, the configuration identifying a quasi-co-location (QCL) information corresponding to each measurement resource; and receiving a CLI report including reported interference metrics for a subset of the measurement resources and associated QCL information corresponding to the reported interference metrics.

Aspect 19: The method of Aspect 18, wherein the subset of the interference metrics and associated QCL information includes a configured number of lowest interference metrics and associated QCL information for each of a plurality of receive beams with a transmit beam repeated by at least one other neighbor transmitting UE on the measurement resources.

Aspect 20: The method of Aspect 18, wherein the subset of the interference metrics and associated QCL information includes a configured number of lowest interference metrics and associated QCL information for a single receive beam repeated with different transmit beams used by at least one other neighbor transmitting UE on the measurement resources.

Aspect 21: The method of any of Aspects 18-20, wherein the CLI report represents each interference metric as an indication of whether the interference metric exceeds a threshold.

Aspect 22: The method of any of Aspects 18-21, wherein the CLI report indicates a QCL information associated with at least one best beam selected by the UE.

Aspect 23: The method of any of Aspects 18-22, wherein the interference metrics include a layer 1 (L1) sounding reference signal (SRS) reference signal received power (RSRP) or L1 CLI received signal strength indicator (RSSI).

Aspect 24: The method of any of Aspects 18-23, wherein the configuration for CLI reporting indicates a panel for each measurement resource.

Aspect 25: The method of Aspect 24, wherein the panel is identified by one of a panel ID, antenna group ID, or SRS resource set ID.

Aspect 26: The method of Aspect 24 or 25, wherein the interference metrics for a measurement resource include a first metric for the QCL information and a first panel and a second metric for the QCL information and a second panel.

Aspect 27: The method of any of Aspects 18-26, further comprising, transmitting, to one or more aggressor UEs, an SRS configuration corresponding to the plurality of CLI measurement resources for the victim UE, the SRS configuration identifying a transmission configuration indication (TCI) state spatial relation parameter and a panel for SRS transmission corresponding to each CLI measurement resource.

Aspect 28: The method of Aspect 27, wherein the SRS configuration includes an SRS resource set including a plurality of SRS resources transmitted with a same spatial filter and port.

Aspect 29: The method of Aspect 27 or 28, wherein the SRS configuration is a radio resource control (RRC) message that indicates repetition of an SRS signal per SRS resource set.

Aspect 30: The method of Aspect 27, wherein the SRS configuration includes an SRS resource including multiple symbols corresponding to different receive beams of the victim UE and the SRS transmission is configured for no hopping across frequency.

Aspect 31: The method of any of Aspects 27-30, wherein the SRS configuration indicates an SRS transmission power based on a closed loop index for a physical uplink control channel.

Aspect 32: An apparatus for wireless communication, comprising: a transceiver; a memory storing computer-executable instructions; and a processor coupled with the transceiver and the memory and configured to execute the computer-executable instructions to perform the method of any of Aspects 18-31.

Aspect 33: An apparatus for wireless communication, comprising: means for performing the method of any of Aspects 18-31.

Aspect 34: A non-transitory computer-readable medium storing computer executable code, the code when executed by a processor causes the processor to perform the method of any of Aspects 18-31.

Aspect 35. A method of wireless communication for an aggressor user equipment (UE), comprising: receiving, from a base station, a sounding reference signal (SRS) configuration corresponding to a plurality of cross-link interference (CLI) measurement resources for at least one victim UE, the SRS configuration identifying a transmission configuration indication (TCI) state spatial relation parameter and a panel for SRS transmission corresponding to each CLI measurement resource; and transmitting an SRS using the TCI state spatial relation parameter, the panel, and a same SRS port on the CLI measurement resources.

Aspect 36: The method of Aspect 35, wherein the panel is identified by one of a panel ID, antenna group ID, or SRS resource set ID.

Aspect 37. The method of Aspect 35 or 36, wherein the plurality of CLI measurement resources correspond to an SRS resource set including plurality of SRS resources transmitted with a same spatial filter and port.

Aspect 38: The method of Aspect 37, wherein the SRS configuration is an RRC message that indicates repetition for the SRS resource set.

Aspect 39: The method of Aspect 38, wherein at least one of the CLI measurement resources includes multiple symbols and the SRS transmission is configured for no hopping across frequency.

Aspect 40: The method of any of Aspects 35-39, wherein transmitting the SRS comprises transmitting the SRS with a transmission power using a closed loop index for a physical uplink control channel.

Aspect 41: An apparatus for wireless communication, comprising: a transceiver; a memory storing computer-executable instructions; and a processor coupled with the transceiver and the memory and configured to execute the computer-executable instructions to perform the method of any of Aspects 35-40.

Aspect 42: An apparatus for wireless communication, comprising: means for performing the method of any of Aspects 35-40.

Aspect 43: A non-transitory computer-readable medium storing computer executable code, the code when executed by a processor causes the processor to perform the method of any of Aspects 35-40.

Aspect 44: A method of wireless communication for a victim user equipment (UE), comprising: receiving, from a base station, a configuration for cross-link interference (CLI) reporting associated with a plurality of measurement resources, the configuration identifying a quasi-co-location (QCL) information and a panel of the victim UE associated with each measurement resource; measuring interference metrics on the plurality of measurement resources based on the configuration for CLI reporting, the QCL information, and the panel associated with each measurement resource; and transmitting a CLI report to the base station, the CLI report identifying the QCL information and the panel associated with the reported measurement resources.

Aspect 45: A method of wireless communication for a base station, comprising: transmitting, to a victim UE, a configuration for cross-link interference (CLI) reporting associated with a plurality of measurement resources, the configuration identifying a quasi-co-location (QCL) information and a panel of the victim UE associated with each measurement resource; and receiving a CLI report including reported interference metrics, the CLI report identifying associated QCL information and the panel corresponding to the reported interference metrics.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a victim user equipment (UE), comprising:
   receiving, from a base station, a configuration for cross-link interference (CLI) reporting associated with a plurality of measurement resources, the configuration identifying a quasi-co-location (QCL) information associated with each measurement resource;
   measuring interference metrics on the plurality of measurement resources based on the configuration for CLI reporting and the QCL information associated with each measurement resource; and
   transmitting a CLI report to the base station, the CLI report including a subset of the interference metrics associated with reported measurement resources and identifying the QCL information associated with the reported measurement resources, wherein the CLI report indicates a QCL information associated with at least one best beam selected by the victim UE.

2. The method of claim 1, wherein the subset of the interference metrics and the QCL information associated with the reported measurement resources includes a configured number of lowest interference metrics and associated QCL information for each of a plurality of receive beams with a transmit beam repeated by at least one other neighbor transmitting UE on the plurality of measurement resources.

3. The method of claim 1, wherein the subset of the interference metrics and the QCL information associated with the reported measurement resources includes a configured number of lowest interference metrics and associated QCL information for a single receive beam repeated with different transmit beams used by at least one other neighbor transmitting UE on the plurality of measurement resources.

4. The method of claim 1, wherein the CLI report represents each interference metric as an indication of whether a threshold interference metric is exceeded.

5. The method of claim 1, wherein the interference metrics include a layer 1 (L1) sounding reference signal (SRS) reference signal received power (RSRP) or L1 CLI received signal strength indicator (RSSI).

6. The method of claim 1, wherein the configuration for CLI reporting indicates a panel of the victim UE for each measurement resource.

7. The method of claim 6, wherein the panel is identified by one of a panel ID, antenna group ID, or SRS resource set ID.

8. The method of claim 6, wherein the interference metrics associated with reported measurement resources include a first metric for the QCL information and a first panel and a second metric for the QCL information and a second panel.

9. The method of claim 6, wherein each measurement resource is associated with a transmit beam and a panel associated with the transmit beam of at least one other UE.

10. The method of claim 1, wherein the plurality of measurement resources include an SRS resource set including plurality of SRS resources where an SRS signal is transmitted with a same spatial filter and a same port.

11. The method of claim 10, wherein the configuration for CLI reporting indicates repetition of the SRS signal per each SRS resource set.

12. The method of claim 1, wherein at least one of the measurement resources includes multiple symbols for SRS transmissions that are configured for no hopping across frequency.

13. The method of claim 1, wherein the measurement resources include an SRS signal transmitted with a transmission power using a closed loop index for a physical uplink control channel.

14. A method of wireless communication for a base station, comprising:
   transmitting, to a victim UE, a configuration for cross-link interference (CLI) reporting associated with a plurality of measurement resources, the configuration identifying a quasi-co-location (QCL) information corresponding to each measurement resource; and
   receiving a CLI report including reported interference metrics for a subset of the measurement resources and associated QCL information corresponding to the reported interference metrics, wherein the CLI report indicates a QCL information associated with at least one best beam selected by the victim UE.

15. The method of claim 14, wherein the subset of the interference metrics and associated QCL information includes a configured number of lowest interference metrics and associated QCL information for each of a plurality of receive beams with a transmit beam repeated by at least one other neighbor transmitting UE on the measurement resources.

16. The method of claim 14, wherein the subset of the interference metrics and associated QCL information includes a configured number of lowest interference metrics and associated QCL information for a single receive beam repeated with different transmit beams used by at least one other neighbor transmitting UE on the measurement resources.

17. The method of claim 14, wherein the CLI report represents each interference metric as an indication of whether a threshold interference metric is exceeded.

18. The method of claim 14, wherein the interference metrics include a layer 1 (L1) sounding reference signal (SRS) reference signal received power (RSRP) or L1 CLI received signal strength indicator (RSSI).

19. The method of claim 14, wherein the configuration for CLI reporting indicates a panel for each measurement resource.

20. The method of claim 19, wherein the panel is identified by one of a panel ID, antenna group ID, or SRS resource set ID.

21. The method of claim 19, wherein the interference metrics for a measurement resource include a first metric for the QCL information and a first panel and a second metric for the QCL information and a second panel.

22. The method of claim 14, further comprising, transmitting, to one or more aggressor UEs, an SRS configuration corresponding to the plurality of CLI measurement resources for the victim UE, the SRS configuration identifying a transmission configuration indication (TCI) state spatial relation parameter and a panel for SRS transmission corresponding to each CLI measurement resource.

23. The method of claim 22, wherein the SRS configuration includes an SRS resource set including a plurality of SRS resources transmitted with a same spatial filter and port.

24. The method of claim 22, wherein the SRS configuration is a radio resource control (RRC) message that indicates repetition of an SRS signal per SRS resource set.

25. The method of claim 22, wherein the SRS configuration includes an SRS resource including multiple symbols corresponding to different receive beams of the victim UE and the SRS transmission is configured for no hopping across frequency.

26. The method of claim 22, wherein the SRS configuration indicates an SRS transmission power based on a closed loop index for a physical uplink control channel.

27. An apparatus for wireless communication, comprising:
   a transceiver;
   a memory storing computer-executable instructions; and
   a processor coupled with the transceiver and the memory and configured to execute the computer-executable instructions to:
      receive, from a base station, a configuration for cross-link interference (CLI) reporting associated with a plurality of measurement resources, the configuration identifying a quasi-co-location (QCL) information associated with each measurement resource;
      measure interference metrics on the plurality of measurement resources based on the configuration for CLI reporting and the QCL information associated with each measurement resource; and
      transmit a CLI report to the base station, the CLI report including a subset of the interference metrics associated with reported measurement resources and identifying the QCL information associated with the reported measurement resources, wherein the CLI report indicates a QCL information associated with at least one best beam selected by the apparatus.

28. An apparatus for wireless communication, comprising:
   a transceiver;
   a memory storing computer-executable instructions; and
   a processor coupled with the transceiver and the memory and configured to execute the computer-executable instructions to:
      transmit, to a victim UE, a configuration for cross-link interference (CLI) reporting associated with a plurality of measurement resources, the configuration identifying a quasi-co-location (QCL) information corresponding to each measurement resource; and
      receive a CLI report including reported interference metrics for a subset of the plurality of measurement resources and associated QCL information corresponding to the reported interference metrics, wherein the CLI report indicates a QCL information associated with at least one best beam selected by the victim UE.

29. The method of claim 1, wherein the configuration identifies the QCL information by configuring the UE with a downlink reference signal (DL RS) for measuring CLI.

30. The apparatus of claim 27, wherein the configuration identifies the QCL information by configuring the UE with a downlink reference signal (DL RS) for measuring CLI.

* * * * *